United States Patent [19]

Matre

[11] Patent Number: 5,031,563

[45] Date of Patent: Jul. 16, 1991

[54] SYSTEM FOR UTILIZING RAISABLE AND LOWERABLE BERTHS IN COMPARTMENTS HAVING A LIMITED SPACE

[76] Inventor: Vigbjörn Matre, Ormerudveien 59A, N-1410 Kolbotn, Norway

[21] Appl. No.: 306,111

[22] PCT Filed: May 26, 1988

[86] PCT No.: PCT/NO88/00046

§ 371 Date: Feb. 28, 1989

§ 102(e) Date: Feb. 28, 1989

[87] PCT Pub. No.: WO88/09271

PCT Pub. Date: Dec. 1, 1988

[30] Foreign Application Priority Data

May 27, 1987 [NO] Norway .................................. 872237

[51] Int. Cl.⁵ .................................................. B63B 29/10
[52] U.S. Cl. .................................... 114/188; 5/9.100; 5/11; 5/118; 5/511; 105/318; 105/323; 114/363; 296/190; 297/217
[58] Field of Search .................. 114/363, 71, 188, 189, 114/192; 105/317, 318, 323, 324; 5/10.2, 9.1, 11, 118, 510, 511; 297/217; 296/190

[56] References Cited

U.S. PATENT DOCUMENTS

| | | | |
|---|---|---|---|
| 2,208,521 | 7/1940 | Clary | 105/324 |
| 2,245,899 | 6/1941 | Campbell | 280/748 |
| 2,323,620 | 7/1943 | Parke et al. | 105/315 |
| 2,383,178 | 8/1945 | Edwards | 114/363 |
| 2,470,853 | 5/1949 | Jones | 105/317 |
| 2,654,895 | 10/1953 | Stevens | 5/10 B |
| 2,783,717 | 3/1957 | Meldrum | 105/317 |
| 2,843,059 | 7/1958 | Norby et al. | 105/317 |
| 2,968,048 | 1/1961 | Roberge | 105/318 X |
| 3,764,159 | 10/1973 | Grime | 280/150 B |

FOREIGN PATENT DOCUMENTS

| | | |
|---|---|---|
| 2348264 | 4/1974 | Fed. Rep. of Germany . |
| 2347275 | 4/1975 | Fed. Rep. of Germany . |
| 2617941 | 10/1977 | Fed. Rep. of Germany . |
| 2923223 | 12/1980 | Fed. Rep. of Germany . |
| 2927166 | 1/1981 | Fed. Rep. of Germany . |
| 3118337 | 11/1982 | Fed. Rep. of Germany . |
| 3430754 | 3/1986 | Fed. Rep. of Germany . |
| 2206212 | 6/1974 | France . |
| 2482536 | 11/1981 | France . |
| 7808301 | 3/1979 | Sweden . |
| 1412043 | 10/1975 | United Kingdom . |

*Primary Examiner*—Sherman D. Basinger
*Attorney, Agent, or Firm*—Pollock, VandeSande & Priddy

[57] ABSTRACT

A system for optimal space utilization by using at least one raisable and lowerable berth. The at least one berth can be raised to a storage or day position and lowered to a service or night position by a driving motor operatively connected to the berth. The position of the berth is essentially horizontal in the storage as well as the service position. The berth is provided with guiding bodies for movable engagement along essentially vertical guide rails fastened adjacent to limiting walls of the compartment in question. The guide rails can also be a part of the bearing structure of the compartment. Below the berth there are arranged at least one permanently mounted, pivotable chair capable of being stowed and/or put down in a position to free the necessary space for lowering the berth to the night position.

20 Claims, 25 Drawing Sheets

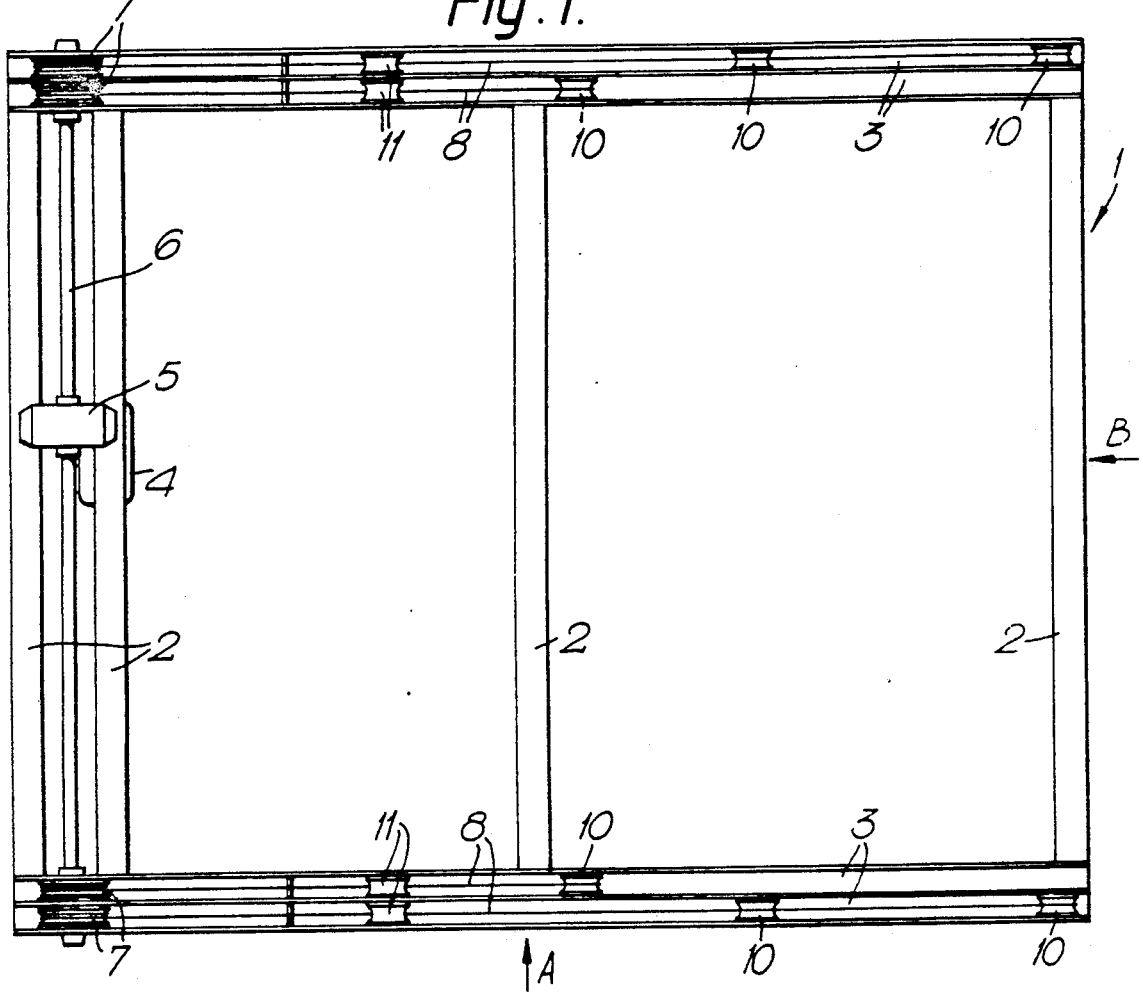
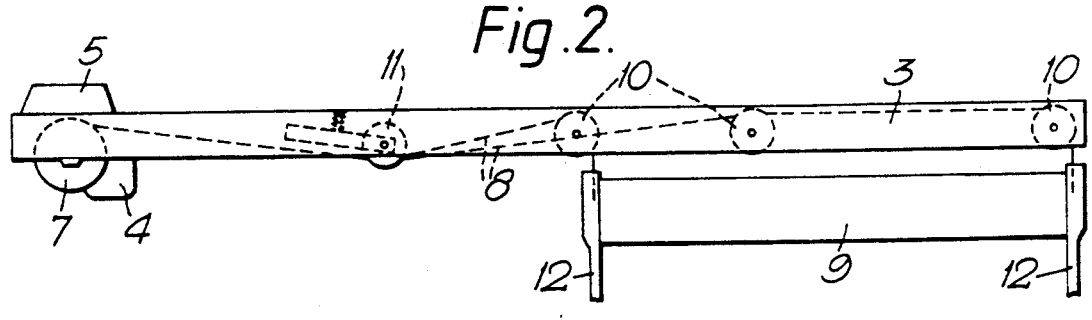
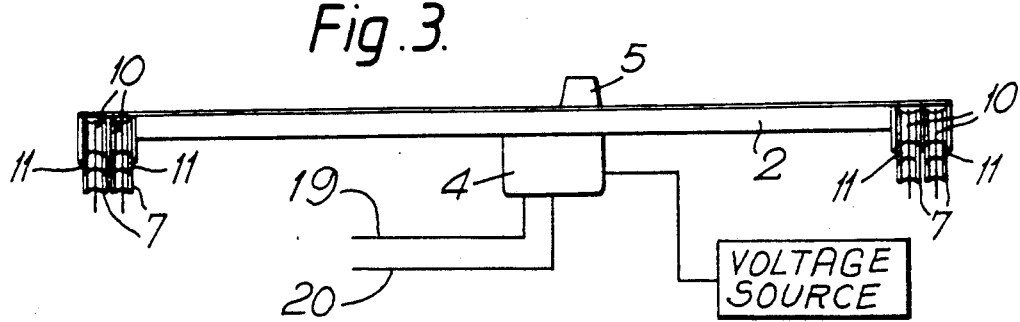

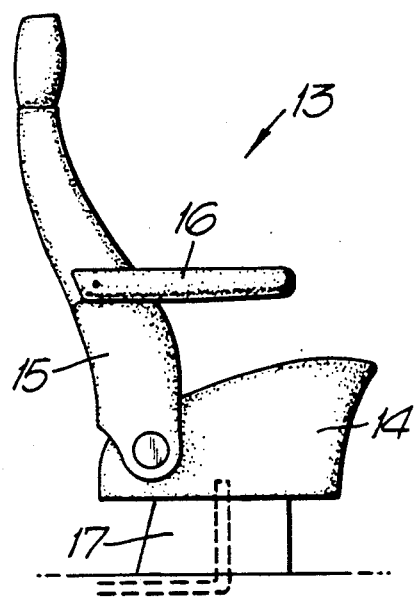
Fig.4A.
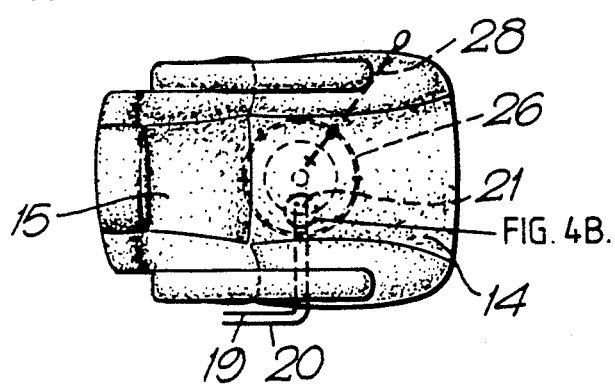
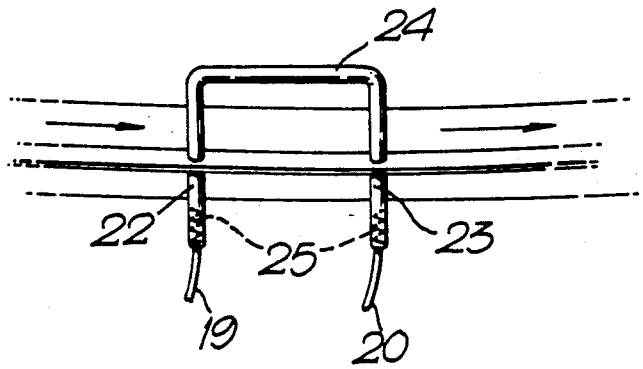
Fig.4B.
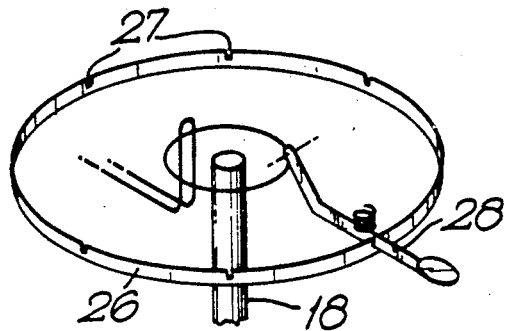
Fig.4C.

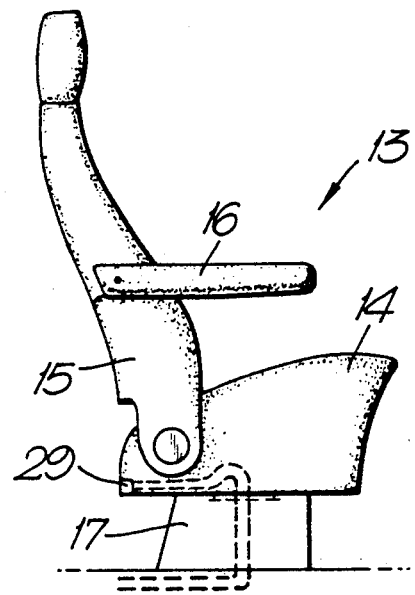
Fig.5A.
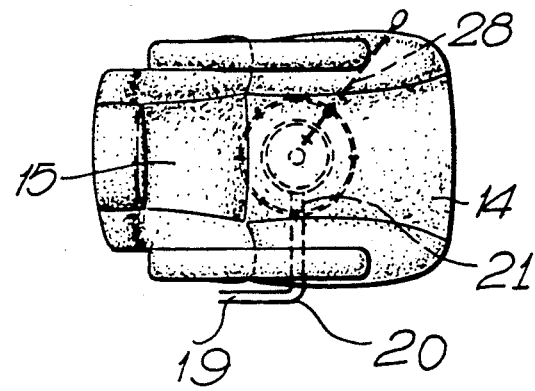
Fig.5B.
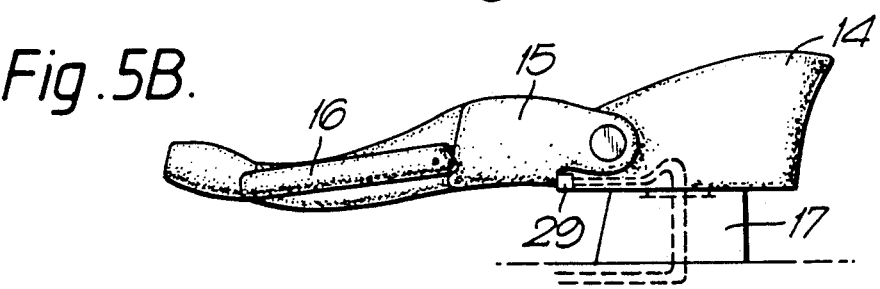
Fig.5C.
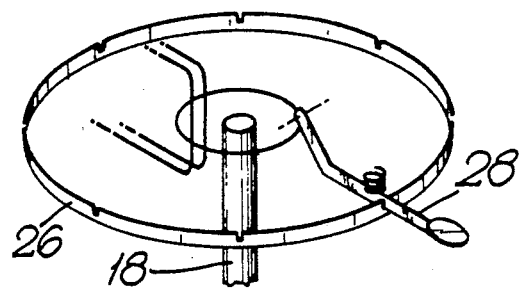

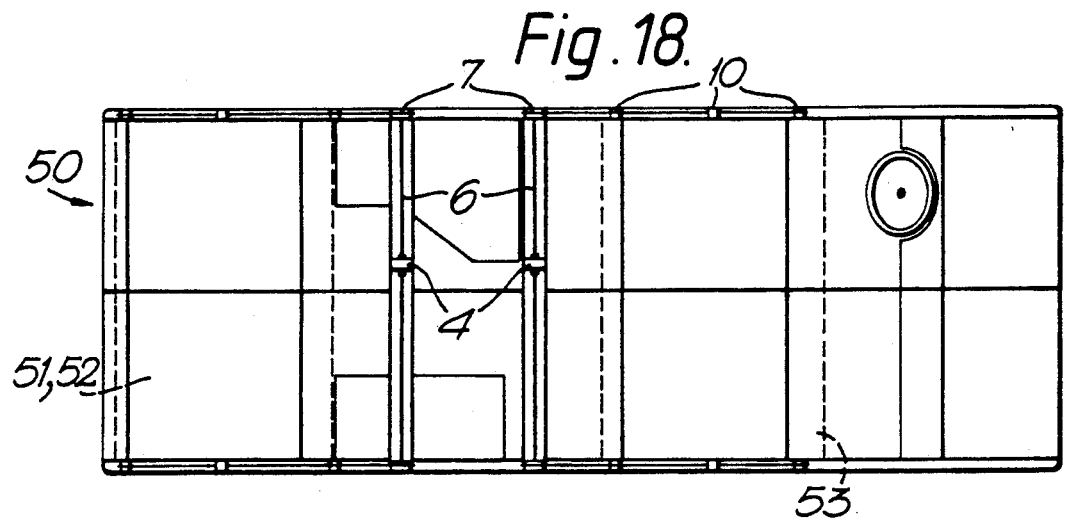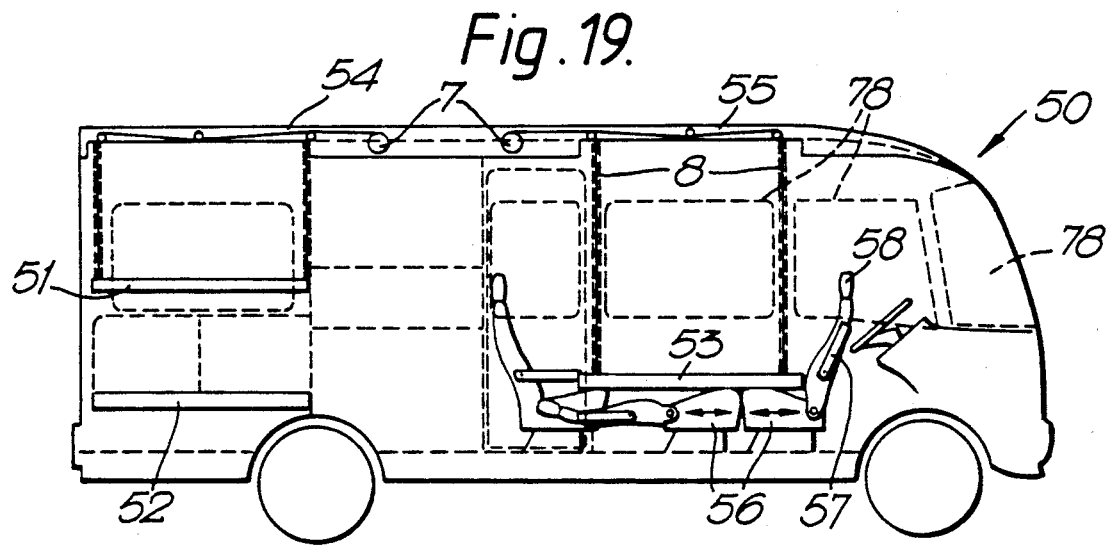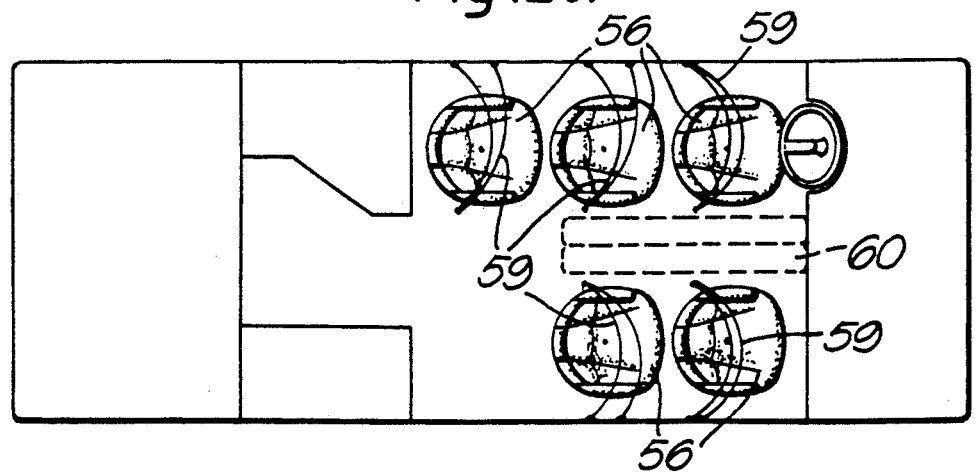

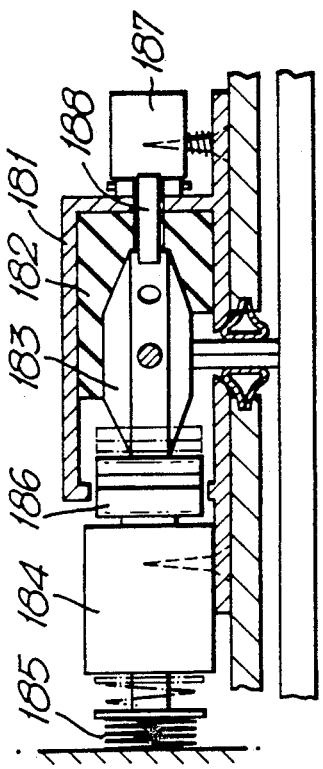
Fig. 46.
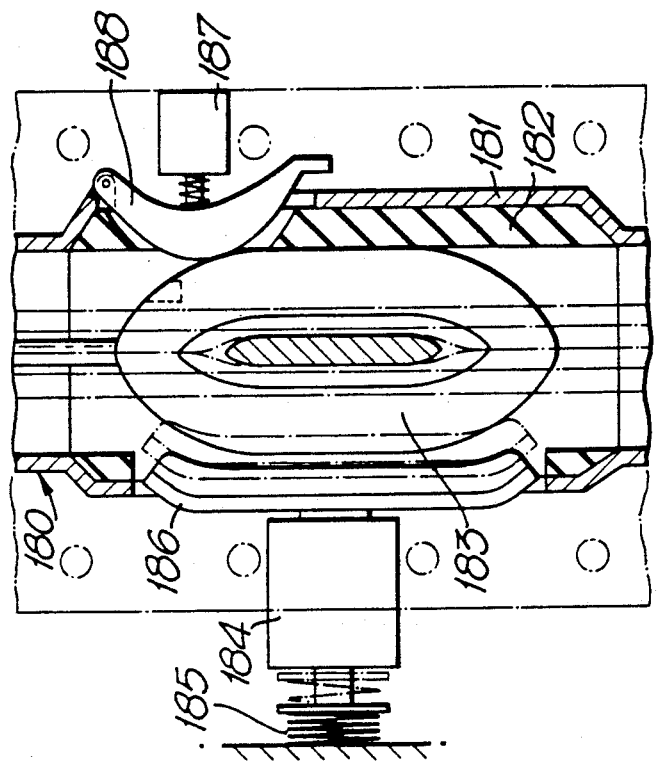
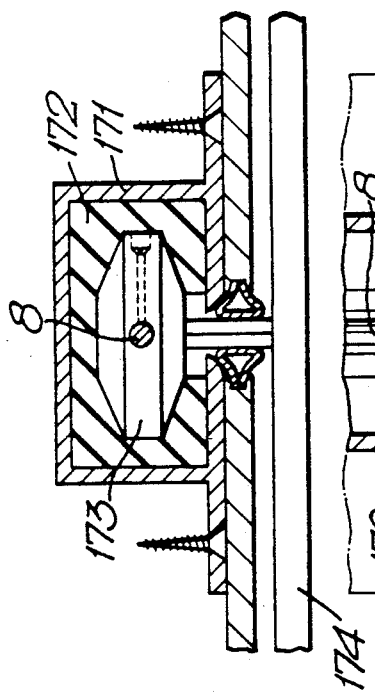
Fig. 47.
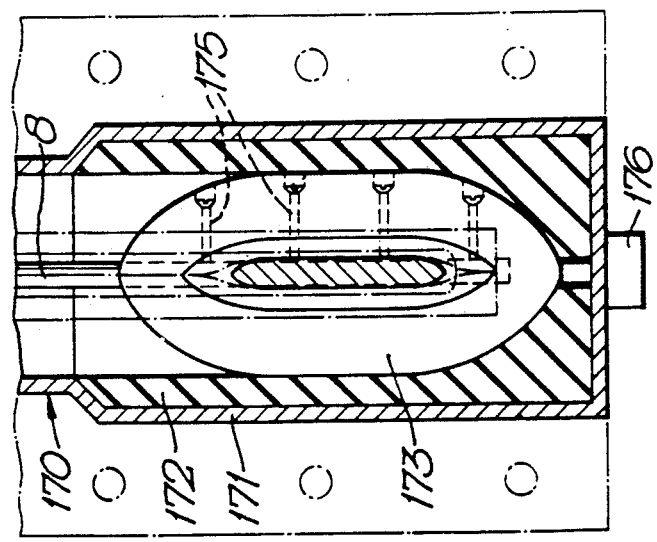

SYSTEM FOR UTILIZING RAISABLE AND LOWERABLE BERTHS IN COMPARTMENTS HAVING A LIMITED SPACE

FIELD OF THE INVENTION

The present invention relates to a system for optimal space utilization by means of at least one raisable and lowerable berth in a compartment having limited space, wherein the berth is arranged to be raised to a storage or day position and lowered to a service or night position by means of a driving means operatively connected to the berth for raising and lowering thereof, the position of the berth being essentially horizontal in the storage as well as in the service position.

BACKGROUND OF THE INVENTION

From DE-OS No. 2 927 166 there is known a raisable and lowerable device which can be raised to a storage position and lowered to a position of use such as stated above. In the known device, a roof covering plate or underroof plate is arranged for sound deadening or fire protection purposes, and the purpose of the device is to design such a roof covering or underroof plate in such a manner that an optimal utilization of the floor surface present in a room can be achieved. Thus, said publication does not relate to and does not show any system for utilizing a raisable and lowerable berth in a compartment having a limited space.

There is a number of fields, especially within the transport sector, wherein there exists a space utilization problem in compartments having a small volume and limited space, and which are for sitting as well as sleeping. For example, the problem is present in railway carriages as well as in cabins on larger boats or in living quarters on e.g. offshore platforms, pleasure boats, camping cars and driver's cabs for large long-transport lorries and "carriage trains".

When fitting for example pleasure boats of approximately 30 feet length, the placement of the berths is a substantial problem. The demand on comfort increases, and the combination sitting/sleeping berths seems to be in retreat. In recent structures, solutions have been based on slipping berths under the floor, both amidships and in connection with a stern cabin. For boats having Diesel engines, such solutions result in bad odors in addition to poor comfort. This berth placement can also result in a certain danger because of risk of gas in connection with pantry and petrol gas. The placing of the berth directly on the bottom of the boat may also result in condensation problems, something which is also objectionable, especially to someone who is rheumatic. Nevertheless, this solution is now preferred.

For camping cars the combination of sitting and sleeping groups is even more difficult since space is even more limited than in a pleasure boat. According to the prior art, combination solutions are used to the extent that sitting and sleeping comforts both suffer. Usually, the double berth is a fixed berth placed over the driver's seat, with a height above the mattress of 60-70 cm to the roof. Older people have problems getting into the berth. On hot summer days this confined space is oppressively hot. A "drawer" which can be pulled down over the driver's seats appears in several recent models. But the height of the "drawer" remains; and such a suspension appears to be rickety and have space limitations even if the berth is raised. The traditional solution with a lowerable dining table and sofa cushions is not very suitable over a long time and results in poor comfort.

On most of the conventional versions it is, however, the safety which is most questionable. A camping car is typically to be driven long-distance. And according to trade news, the percentage of retiree buyers is rising. This means that the demand on sleeping comfort and safety during driving must be set high. For families with children, the car's safety is often decisive. Today's parents of small children are not willing to reduce their demands, and a camper should have the same safety devices as a modern passenger car. In practice this means that one must be able to expect seats having headrests and seatbelts in all seats. Sharp table edges should also be avoided. These desirable features are not met in the hitherto existing structures.

In the case of driver's cabs for buses and transport lorries ("carriage trains"), the known structures are encumbered with substantial shortcomings and limitations with respect to comfort and working environment. Traditionally, but for minor deviations, the area behind the seats has been reserved for a pair of berths. In practice, this means that it is difficult to move into the driver's cab even if there is full headroom.

At present, the working environment for long-transport drivers is far below what may be acceptable for most work places. For example, the demands for living quarters, comfort etc. in fishing boats and boats for carrying trade have changed radically over a few years. Modern campers and caravans are equipped with a shower, WC, warm and cold water, cooking facilities, etc. as a matter-of-course, even if most of the camping places to which these are referred are outfitted with these amenities. A long-transport driver often has to park the carriage train over night and therefore has a far greater need for these facilities. The demand for regular meals, and familiar types of food, may also arise. A separate kitchen with a microwave oven, refrigerator, freezer, etc., would therefore make cooking simpler and relieve the driver from stress. Regular exercise which requires a proper shower should also be mentioned. However, such cannot be realized with known principles.

It is a general object of the present invention to provide a system utilizing at least one raisable and lowerable berth in a compartment having limited space in such a manner that the available space is optimally utilized to provide very good sleeping comfort and by a simple operation, good sitting comfort without using any of the previously discussed combination solutions.

Another object of the invention is to provide a system which is very simple to operate and safe in use.

A more particular object of the invention is to provide a system devoid of said problems and shortcomings of the prior art in the fields mentioned above.

SUMMARY OF THE INVENTION

The above-mentioned objects are achieved with a system characterized in that the berth is provided with a number of guiding bodies for movable engagement along corresponding, essentially vertical guide rails fastened adjacent to limiting walls and/or a part of the bearing structure of the compartment, and that permanently mounted, pivotable chairs or similar sitting means are arranged below the berth and arranged to be turned to and/or put down in a position to free the necessary space for lowering of the berth to the night position.

In an advantageous embodiment of the system wherein the driving means is a reversible electric motor coupled through a circuit to a voltage source, the chairs are provided with normally open contacts arranged to be closed in a given chair position and connected to the circuit of the motor, so that the motor lowers/raises the berth only if the chairs are in a specific position below the berth.

An advantageous embodiment of the system adapted to be used in a compartment of a vehicle such as in a railway carriage or in a cabin in a boat or the like includes a pair of berth pairs which are arranged next to and spaced from each other. Each of the pair is coupled to a respective driving means and arranged above a respective chair group, so that the berth pairs can be lowered individually to the night position after the chair group in question has been turned to the freespace position.

Given the area used for a double sleeping compartment in new railroad carriages, the area of two such compartments gives a suitable area for four berths of the above-mentioned embodiment at night and spacious seating for four persons during the day. For example, such an embodiment means that a family having small children can be together for the entire journey, and the berths for the children can be lowered and used while the parents can still be up. This yields an agreeable way of travelling for families, and in principle it will be as if the family is staying at a hotel room. A sufficiently large folding table can be arranged between the chair pairs to eliminate dining cars for additional profit. The same could be done for larger boats and ferries, or in living quarters of offshore structures. A differentiated compartment/cabin offer can be extended according to requirement, for example two, four or six berths.

Another advantageous embodiment of the system usable in a camper, a pleasure boat or the like, has a berth in the form of a double bed which is lowerable over a chair group consisting of swivelling as well as folding chairs. The chairs—when the berth is raised—optionally can be positioned in the speed direction of the car/boat or slewed inwards towards a dining table, which can be put up from a position set into the floor.

The use of one or two double lowerable and raisable berths provides substantially better sleeping comfort than the known solutions for pleasure boats, and still not be noticeably more expensive, viewed in relation to the total price of such a craft. Raisable and lowerable berths are even better adapted to be used in boats having a flybridge.

Chairs with arm rests are also far more comfortable in heavy sea than longitudinally extending sofas. Combined with a dining table which is collapsible a maximum floor area during driving and a comfortable sitting group around the table during meals when the boat is at a standstill are provided. This solution will also free up space below the floor, something which facilitates servicing of the engine and driving gear. It will further result in more space for fuel and water tanks and, not least, more space for trunks, fishing tackle, etc. The extra height needed in the cabins, on a boat can be compensated for without having to disfigure the cabin.

Such a solution may be attractive also for professional boats where demand for efficiency is high.

By utilizing raisable and lowerable berths in combination with slewing (pivotable) chairs having arm rests and headrests in a camping car, the consideration for sleeping comfort as well as safety is taken care of. In case of transport of smaller children, the seat can be turned with the back towards the driving direction in order to have the greatest possible safety. By collapsing the dining table into the floor, the table edges are removed during driving and a higher freedom of movement when getting into and out of the car is provided. It may also be desirable to have the table lowered (put down) when using the chairs as a sitting group.

It is to be noted that a simpler version of the camping car may be a work car, i.e. a combined means of transport and a messroom. A spacious entry portion with a wardrobe and a shower compartment will then be practical.

An additional, advantageous embodiment of the inventive system for use in a driver's cab having a large headroom in a lorry or a carriage train, includes at least one transversely extending berth mounted in the space above the driver's seat and the side seat and being guided by respective guide rails extending along the side walls of the driver's cab, the driver's chair and the side chair being able to be put down and/or slewed in order to give room for lowering of the berth or the lowermost berth to the night position.

The principle according to the invention, i.e. raisable and lowerable berths in combination with folding/swivelling chairs, provides interesting possibilities for the above-mentioned embodiment. During meals, this gives a far more open space feeling. The space in the rear portion of the driver's cab can be used for a relatively spacious kitchen, a bath and a water closet. In that the berths in daytime do not occupy floor area, a maximum utilization of the area is achieved. Slewable chairs and a relatively large distance to the rear wall of the driver's cab give the possibility of using TV/video. The resting driver can look at TV also during driving and relax better than what is possible with the conventional driver's cab constructions. The freed space behind the chair of the resting driver allows the resting driver to put down the back of the chair for a shorter period of relaxation, without using the upper berth.

The relatively large floor area allows satisfactory access to the engine and driving gear through a hatch in the floor, without lifting the driver's cab. If the of the engine and driving gear, this may be done by means of hydraulics or air. A water tank for warm and cold water and for discharge water can be placed between the frame and/or under the driver's cab.

BRIEF DESCRIPTION OF THE DRAWINGS

The invention will be further described below in connection with exemplary embodiments with reference to the accompanying drawings, wherein:

FIG. 1 shows a schematic plan view of a frame structure having a driving means in the form of a motor with associated transmission means and wires mounted therein for lowering and raising of a berth in a system according to the invention;

FIG. 2 shows a side view of FIG. 1 in the direction of the arrow A;

FIG. 3 shows a front view of FIG. 1 in the direction of the arrow B;

FIGS. 4A, 4B, 4C show a pivotable chair having a contact means in the swivel column of the chair;

FIGS. 5A, 5B, 5C show a pivotable and collapsible chair which has also a contact means in connection with the back of the chair;

FIGS. 18–21 show schematic plan views and a side view (FIG. 19) of an embodiment of the system according to the invention in a camping car, with berth means and chair group shown in different functional positions;

FIG. 46 shows a longitudinal section and a cross-section of a lower end portion of a guide rail with a guiding body;

FIG. 47 shows a longitudinal section and a cross-section of an enlarged intermediate portion of a guide rail with a guiding body and a holding means thereof;

DETAILED DESCRIPTION OF THE PREFERRED EMBODIMENTS

Figure 6:
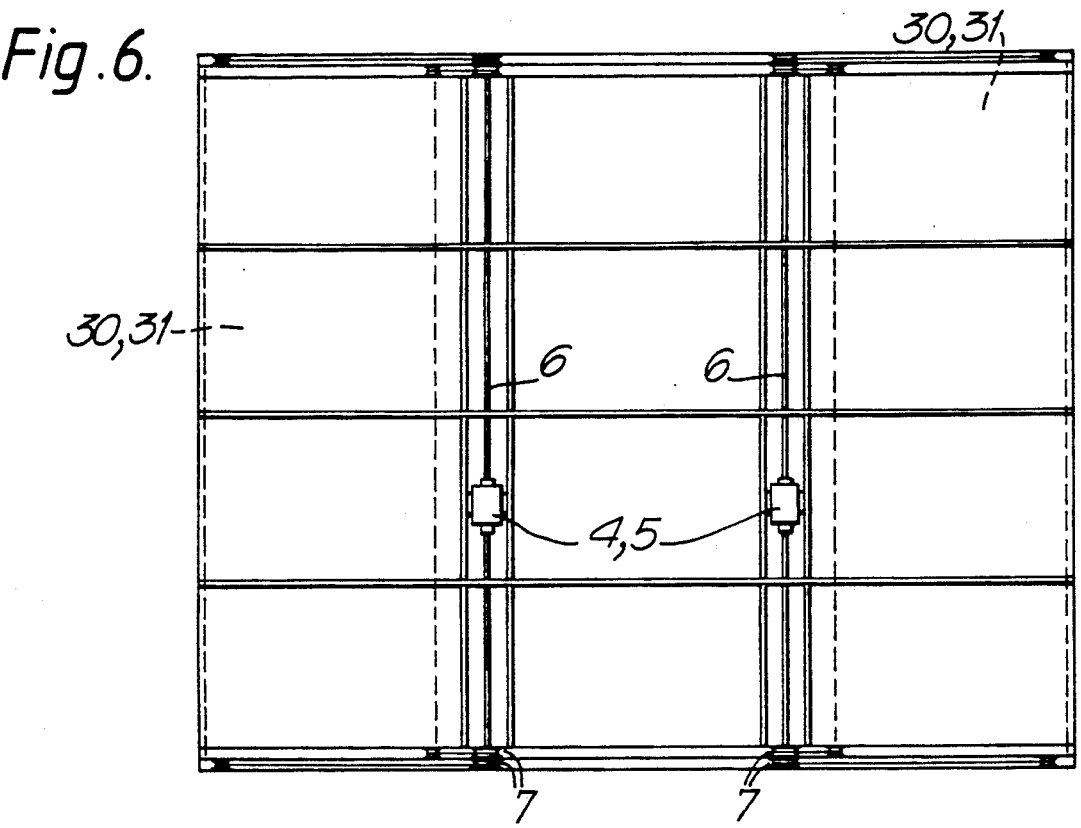
FIGS. 6 and 7 show a schematic plan view and a side view, respectively, of an embodiment of the system according to the invention in, e.g., a railway compartment or a boat cabin.

In the drawings, similar or corresponding elements in the different figures are partly designated by the same reference numerals.

As stated above, the system according to the invention includes at least one berth which is raisable and lowerable by a driving means, the berth having a number of guiding bodies guided along essentially vertical guide rails which can be fastened to limitation walls of the compartment wherein the system is installed. In the following description, the system according to the invention will be described in connection with a driving means in the form of a reversible electric motor. However, there may also be contemplated other types of driving devices for raising and lowering the berth or berths, for example a driving means based on hydraulics.

An embodiment of the arrangement for raising and lowering of a berth is schematically shown in FIG. 1. The shown embodiment includes a rectangular frame consisting of four transversely extending beams 2 and two pairs of longitudinally extending beams 3 which are fastened to respective ends of the beams 2 and for instance may consist of downwards open U beams of e.g. aluminum. On one of the transversely extending beams 2 at one end of the frame there is mounted a reversible motor 4 which is coupled to a transmission means consisting of a gearbox 5 and a driving shaft 6 connected thereto and suitably journalled at its ends in the longitudinally extending beams 3. On each end of the shaft there are attached a pair of rollers or reels 7 located in a respective one of the channel beams 3. Each of reels 7 receives a wire 8. The four wires 8 are connected to respective corners of a raisable and lowerable berth 9, as schematically shown in FIG. 2. The wires run over associated pulleys 10 mounted in the channel beams 3. The wires are kept tight by means of spring-loaded pulleys 11.

At the corners the berth 9 is provided with guiding bodies in the form of sliders which are in engagement in grooves in vertical guide rails 12. These sliders are not shown in FIG. 2, but the arrangement in connection therewith will be further described with reference to FIGS. 44-51. Thus, when the motor 4 is rotated in the desired direction, the berth 9 is lowered or raised by unreeling or reeling the wires 8 from or onto the reels 7. The guide rails then in a stable manner guide the berth during the movement thereof and in addition keep the berth stably in place in its end position.

The motor 4 preferably is an electric motor, although other motor types may be contemplated and used. As shown in FIG. 3, a voltage source is electrically connected to motor 4 to provide electrical energy therefor for movement when a connection is effected by connectors 19 and 20 from contact means 21 shown in FIG. 4A, to be discussed below. As further described below, switches are built into the guide rails to ensure automatic stop at the end position when raising the berth or berths, and in some cases when lowering the berths. In cases where two berths are arranged one above the other, for safety reasons, the lowermost berth is stopped by a photocell which is placed in front of the lower and outermost corner of the berth. This implies that if the light towards the photocell is interrupted during lowering of the berth, the movement of the berth is automatically stopped.

As mentioned, the guide rails advantageously are arranged to be fastened to limiting walls of the compartment wherein the system is installed. The rails provide reinforcement of the walls. Correspondingly, the carrier beams of the frame normally are fastened to the roof of the compartment in question and thus provide reinforcement of the roof. Thus, the rails and frame beams may be arranged as integral parts of the limiting or defining surfaces of the compartment in question.

In the system according to the invention, pivotable or rotatable chairs or the like are arranged below the berth or berths, to be turned to and/or put down in, i.e. maneuvered to, a position in which they free space for lowering the berth to the night position. Thus, the chairs must be placed in a suitable position before complete berth lowering can be effected. For obtaining a simple and safe operation of the system, it is expedient to build in a safety means requiring that the chairs be in a correct position before berth lowering can take place. FIGS. 4 and 5 show such a safety means and more specifically embodiments wherein the chairs are provided with normally open contact means which are closed in a definite chair position and connected to the feeding circuit of the motor, so that the motor cannot start for lowering or raising the berth until the chairs are placed in the correct position.

FIG. 4A shows a chair 13 consisting of a seat member 14 and a back member 15 having hinged arm rests 16. The seat member 14 is rotatably mounted on a base member 17 which may comprise a chair column 18 as shown in FIG. 4C. A line having conductors 19, 20 forming part of the feeding circuit of the motor 4 is carried to a contact means 21 at the chair column 18. As shown in the detailed view in FIG. 4B, the contact means comprises contact points 22, 23 arranged in the base member and interconnected by means of a shorting conductor element 24 in the rotatable seat member, so that the circuit is closed in a definite chair position. If desired, there may be arranged more than one shorting or contact-forming conductor element, so that the circuit can be closed in a corresponding number of chair positions. As suggested in FIG. 4B, springs 25 are arranged in connection with the contact points in order to ensure a good contact.

FIGS. 4A and 4C also show a ring member 26 arranged on the base member and provided with a number of notches 27 constituting "parking points" for the chair seat 14. The chair seat can be parked at a desired parking point by means of a spring-actuated lever 28 attached to the seat member.

FIGS. 5A, 5B, and 5C show a chair 13 corresponding to the chair in FIG. 4A, but in which the contactforming conductor element is modified and formed as a line connection having an additional contact means or switch 29 which is arranged at the lower edge of the back member 15 of the chair and which is closed only when the back member is put down.

FIGS. 6-9 schematically show an embodiment of the system according to the invention installed in, e.g., a railway compartment or a boat cabin. The system includes two berth pairs arranged next to and at a distance from each other. Each berth pair consists of a pair of berths 30, 31 which are raisable and lowerable from a frame structure 32 arranged in the ceiling. Further, a chair group, each consists of a pair of rotatable chairs 33, is arranged below each berth pair. The frame structure 32 in principle is constructed in the same manner as the frame 1 in FIGS. 1-3, but is shown to comprise a different number of longitudinally and transversely extending beams with a view to forming an integral and load-bearing part of the ceiling of the room. In the frame structure an operating unit is built in for each berth pair. Each operating unit comprises a motor 4, a gearbox 5, a driving shaft 6 having a pair of reels 7 at each end, together with wires 8 running over pulleys 10, in a manner corresponding to that shown in FIG. 1.

Figure 7:
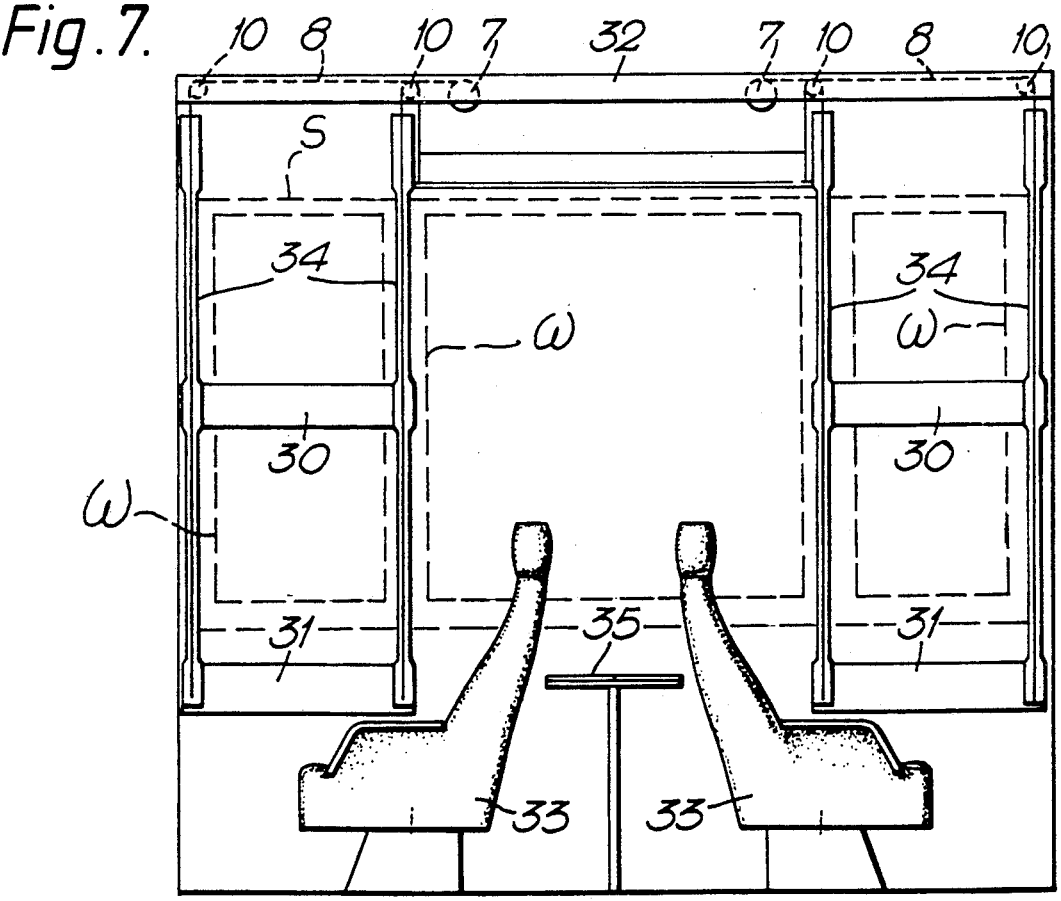
Figure 51:
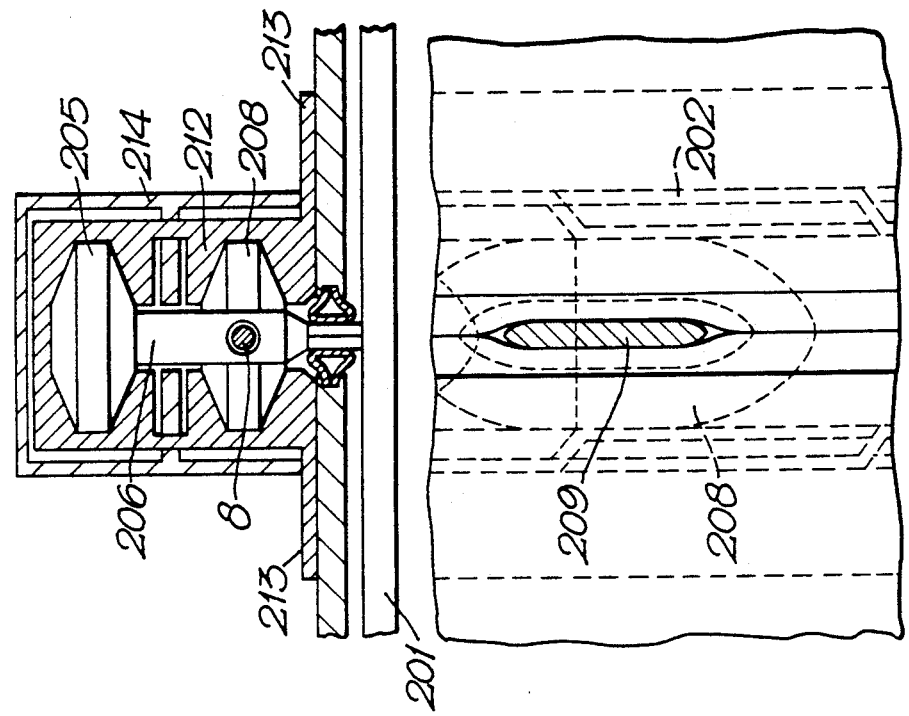
FIG. 51 shows a cross-section viewed from above and a fragmentary front view of the embodiment in FIG. 50.

The wires 8 are attached to the lowermost berth 31 of each pair, so that the upper berth 30 rests on the lower berth 31 when the berths are in a raised position. For the sake of simplicity, the guide rails 34 provided for the berths are only depicted in FIG. 7 and are assumed to be attached to the end walls of the room. The guide rails for the upper berths extend only down to the end point for these berths, i.e. to the central area of the rails for the lower berths. In the region where the rails extend next to each other, they may be formed as a double rail, as shown in FIGS. 50 and 51. As shown in FIG. 7, the rails are provided with enlarged portions at the end points and the middle of the long rails. At these portions there are provided vibration-restraining packings for the guiding bodies of the berths, and also switch and stop means for the berths. These arrangements will be further described with reference to FIGS. 45-51.

Figure 8:
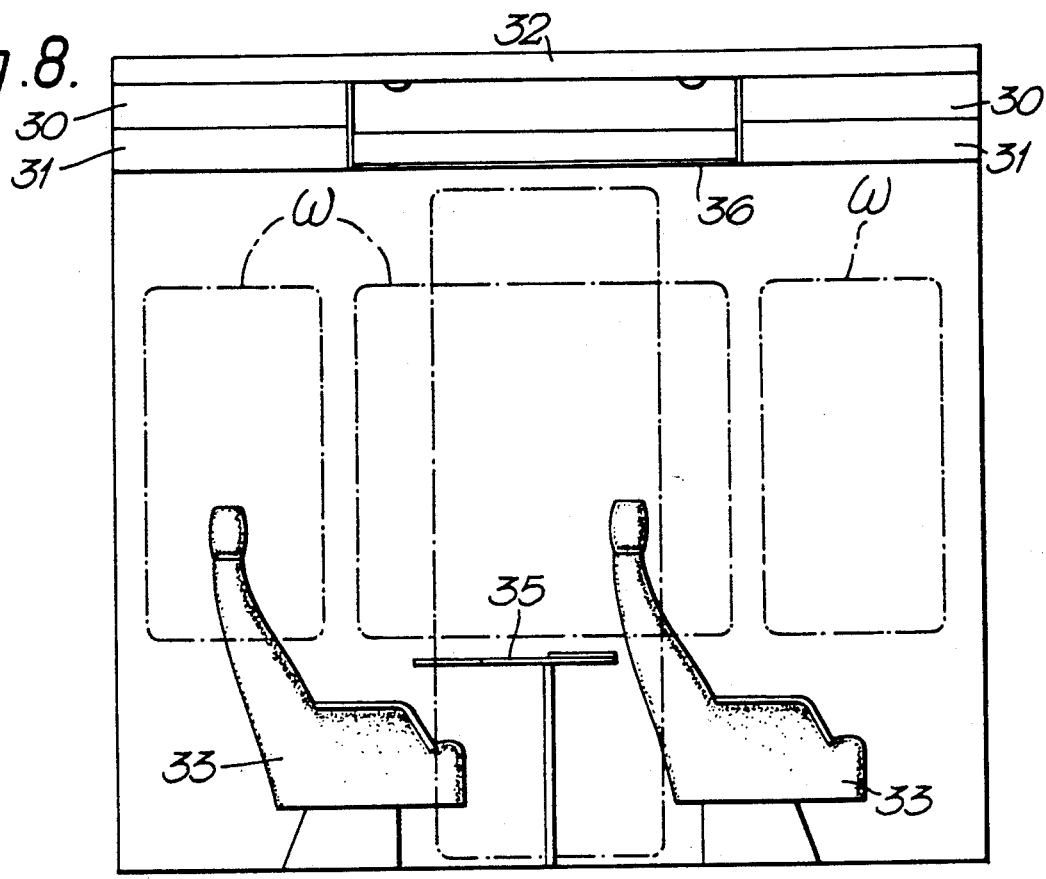
FIGS. 8 and 9 show a side view and a plan view, respectively, of the embodiment shown in FIGS. 6–7, with the associated chair group shown in different positions.
Figure 9:
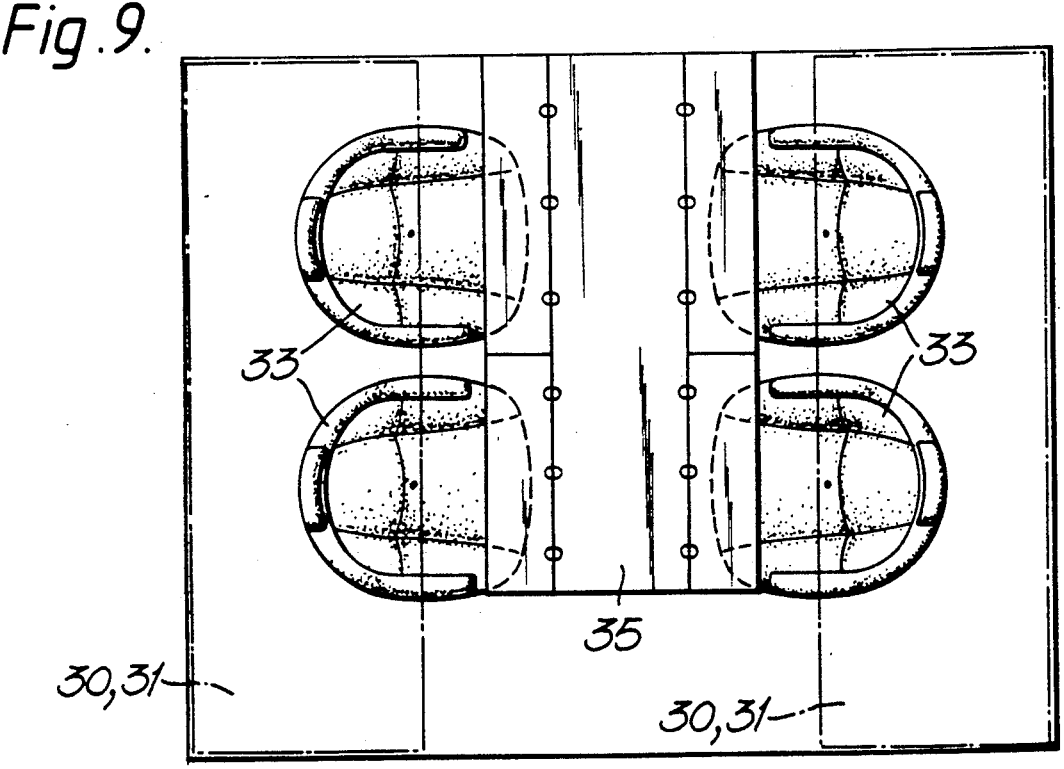
Figure 10:
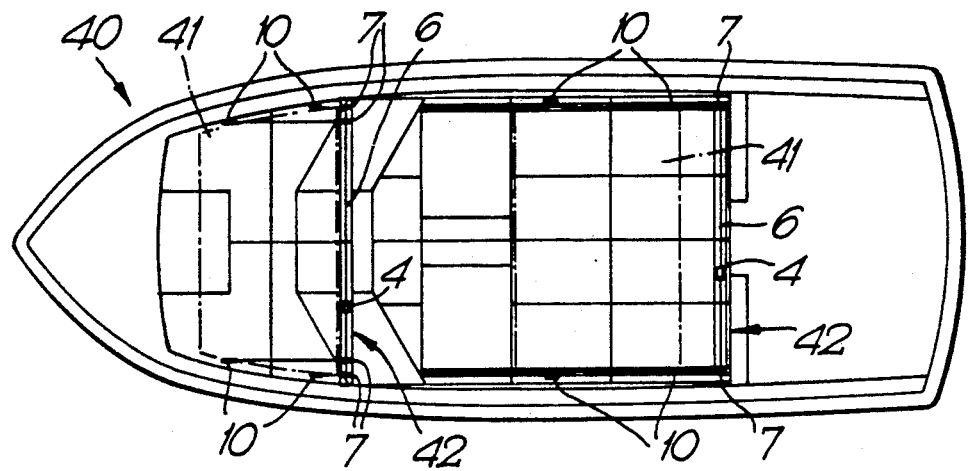
FIGS. 10–13 show schematic plan views of an embodiment of the system according to the invention on a pleasure boat, with berth means and chair groups shown in different functional positions.

A table 35 is provided between the chair groups. This is a table having foldable flaps usable in different positions, as shown in FIGS. 8 and 9. In FIG. 8, the berths are in the raised position and all the chairs are positioned along the direction to which the vehicle is traveling. One of the flaps is turned out for use by persons sitting in the two chairs facing the table. In FIG. 9 all the chairs 33 are facing the table 35 and both flaps of the table are turned out.

The underside of the lower berths advantageously may be covered by the same material as the material forming the surface of the ceiling 36, so that a uniform ceiling surface is achieved when the berths are in the raised position.

When utilizing the above described system in a railway coach, there may advantageously be included a shield arrangement S (see FIG. 7) which is connected to the upper or lower berth, for instance to the sliders (FIG. 44-51) of the berth. When the berth is lowered, the shield arrangement S is lowered together with the berth to prevent viewing into the compartment from windows W (FIGS. 7 and 8) when the berth is in the service position. By means of such an arrangement e.g. several system units of the type shown in FIGS. 6-9 may be arranged next to each other in a railway coach which is otherwise open or has partitions of glass or other transparent material mounted between the system units.

FIGS. 10-15 schematically show an embodiment of the system according to the invention installed in a pleasure boat 40. As appears, the illustrated embodiment includes two such systems of which one is mounted amidships in the main cabin and the other is mounted in the front cabin. Each system includes a berth 41 which in this case is formed as a double bed and which is raisable and lowerable from a frame structure 42 arranged in the roof. A chair group is arranged below each of the berths. The chair group in the main cabin consists of five rotatable (swivelling) and possibly collapsible (folding) chairs 43, whereas the chair group in the front cabin consists of four rotatable chairs 44. In a manner corresponding to that of FIGS. 6-9, the frame structure 42 consists of longitudinally and transversely extending beams forming an integrated part of the roof. Each frame structure supports a motor 4 with associated gearbox, a driving shaft 6 with associated reels 7, together with wires 8 running over pulleys 10, in a manner corresponding to that of FIG. 1.

Figure 15:
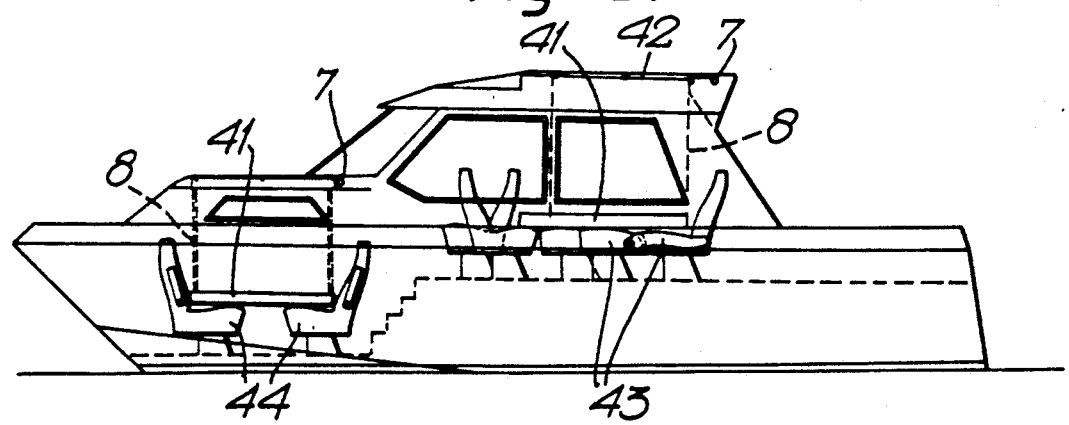

The chairs 43 and 44 may be of the type shown in FIGS. 4 and 5. When the berths 41 are in the raised position (FIGS. 11 and 14), all the chairs may be aligned along the direction to which the vehicle is traveling, whereas they are arranged as shown in FIGS. 12 and 15 when the berths are in a lowered position. As shown, also the back members are put down on two chairs 43' in the main cabin, to give room for the berth in the lowered position. The chairs are provided with contact means as shown in FIGS. 4 and 5, to ensure lowering of the berths only when the chairs are placed in the correct position. (The same applies to the chairs 33 in the embodiment according to FIGS. 7-9).

Figure 11:
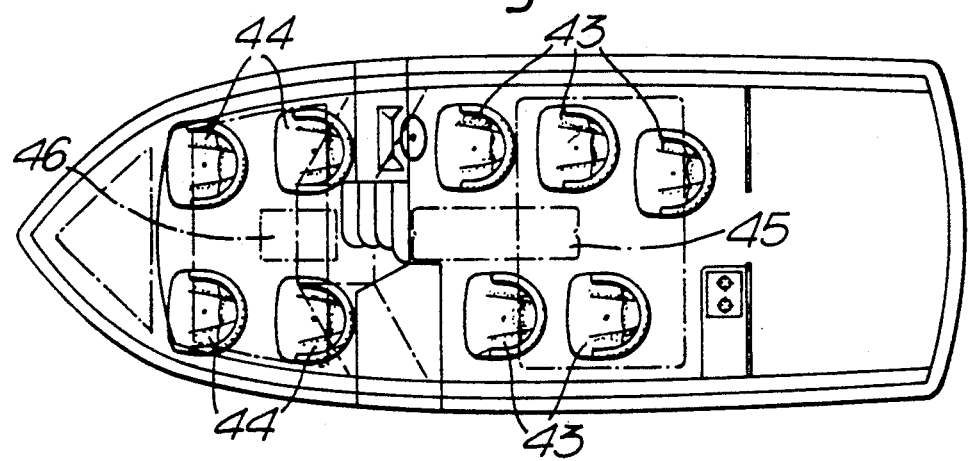
Figure 12:
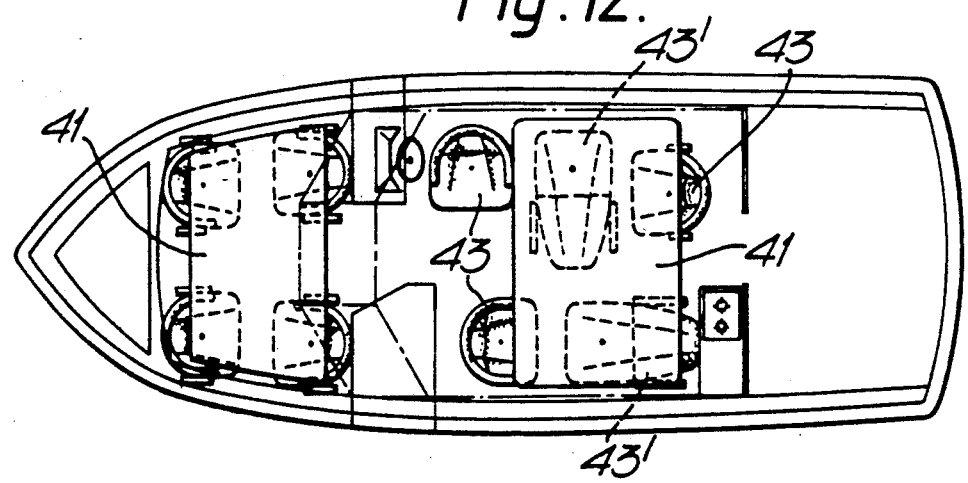
Figure 13:
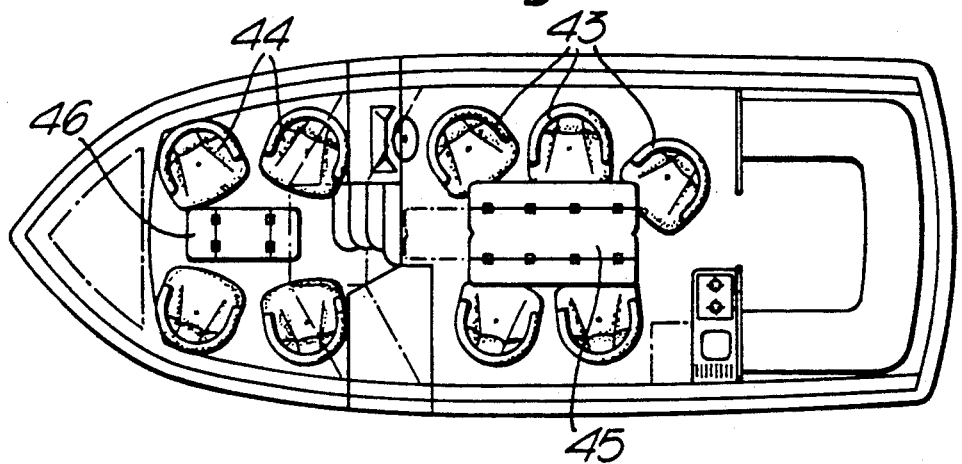
Figure 14:
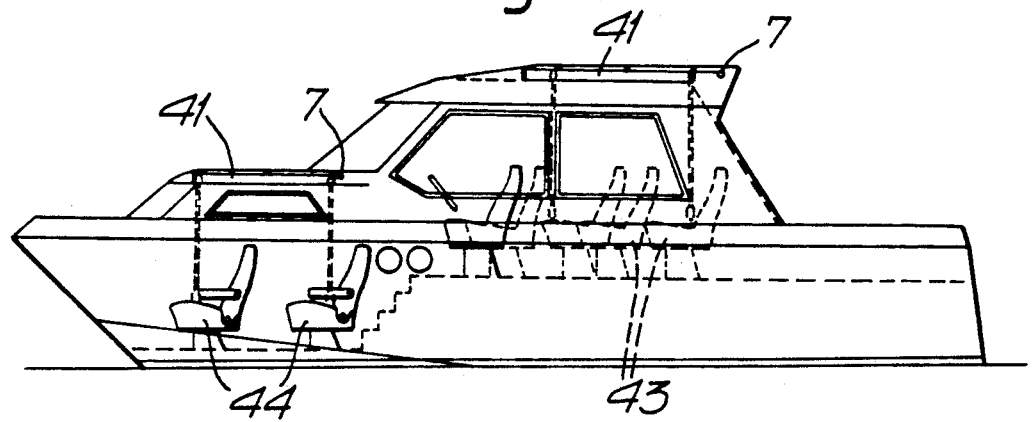
FIGS. 14 and 15 show side views of the pleasure boat corresponding to the functional positions according to FIGS. 11 and 12.

As shown in FIGS. 11 and 13, a table 45 is provided in the main cabin. The table 45 is a flap table which can be set into the floor so that it is flush with and forms a part of the floor surface when it is lowered. A suitable table structure will be described below with reference to FIGS. 22-24. Also in the front cabin there is provided a similar collapsible flap table 46.

Figure 16:
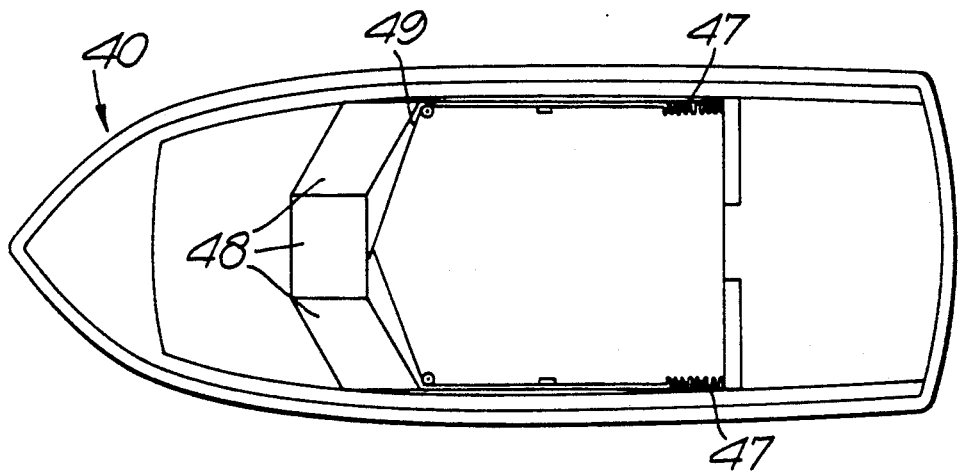
FIGS. 16 and 17 show schematic views of the boat in FIGS. 10–15 wherein the system is provided with a curtain screening means for the windows of the boat.
Figure 17:
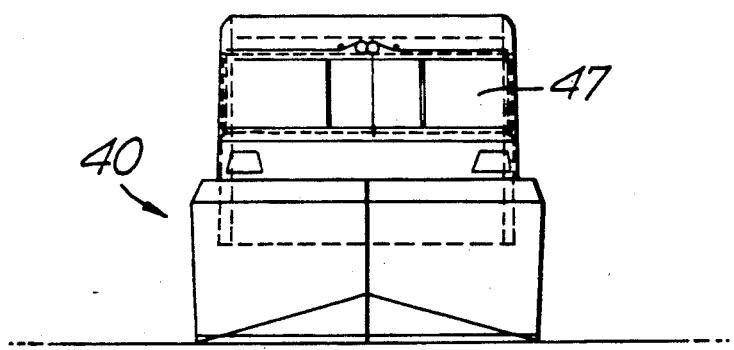
Figure 21:
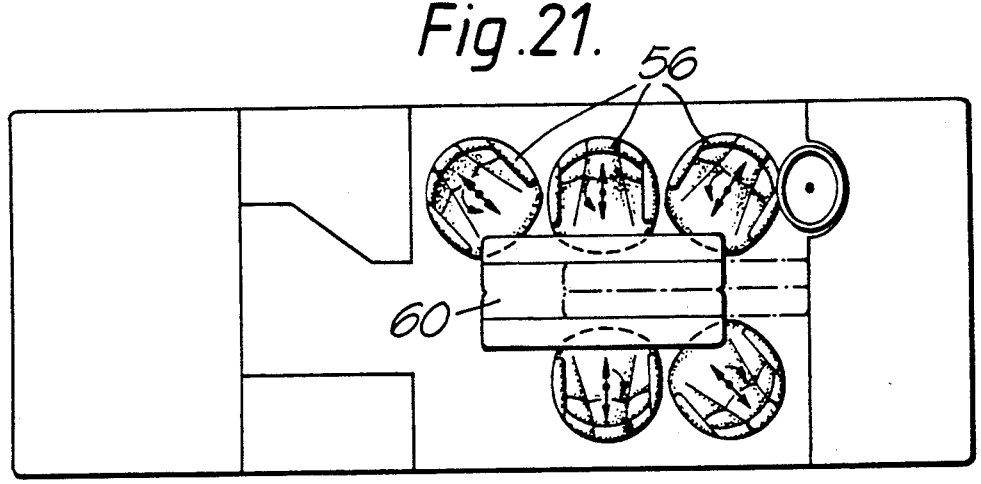

In FIGS. 16 and 17, the system on the pleasure boat 40 is shown to be provided with a screening means in the form of a curtain 47 which is arranged to be drawn before the windows 48 of the boat, especially when the berth or the berths is/are in the night position. The curtain is carried by a wire 49 coupled to a motor (not shown) to move the curtain.

A suitable embodiment of such a curtain means will be further described below with reference to FIGS. 41-43.

FIGS. 18-21 schematically show an embodiment of the system according to the invention installed in a camping car 50. The illustrated embodiment includes a pair of berth systems, more specifically a double-berth system arranged at the back of the car and consisting of an upper berth 51 and a lower berth 52, and a berth 53 in the form of a double bed arranged in the central region of the car. The double-berth means 51, 52 is raisable and lowerable from a frame structure 54 provided in the roof, and may be formed in a similar manner as each of the double-berth means according to FIGS. 6 and 7. The berth 53 in the central region of the car is raisable and lowerable from a frame structure 55 provided in the roof and is arranged above a chair group consisting of five rotatable and possibly collapsible chairs 56. The frame structures 54, 55 in principle are designed as described above and support respective motors 4 with associated gearbox, a driving shaft 6 with associated reels 7, together with wires 8 running over pulleys 10.

As appears from FIG. 19, the chairs 56 are provided with arm rests 57, which can be turned up when the berth is lowered, and headrests 58 for safety and driving comfort. As shown in FIG. 20, there are also provided safety belts 59. The chairs 56 may otherwise be equipped and arranged as described in connection with FIGS. 10-15. Before the berth 53 is lowered, the chairs are pivoted and lowered in a suitable manner to the positions intended for this operation, such as shown in FIG. 19.

Figure 22:
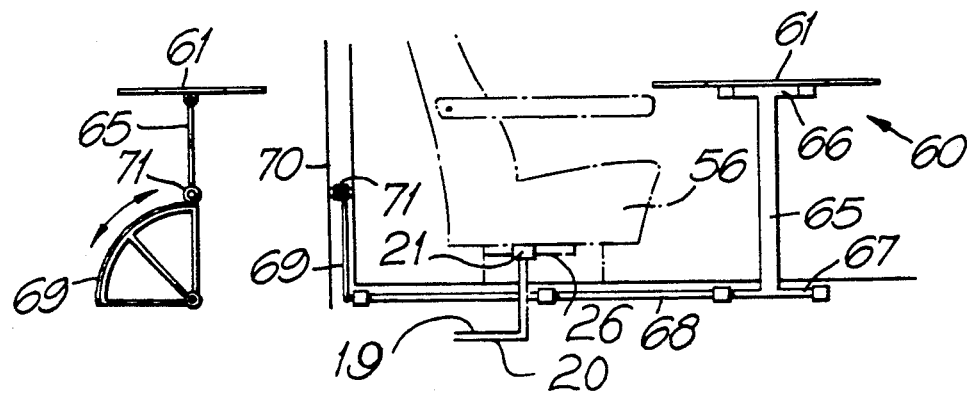
FIGS. 22 and 23 show schematic side, end and plan views of a collapsible table forming part of the embodiments according to FIGS. 10–15 and FIGS. 18–21.
Figure 23:
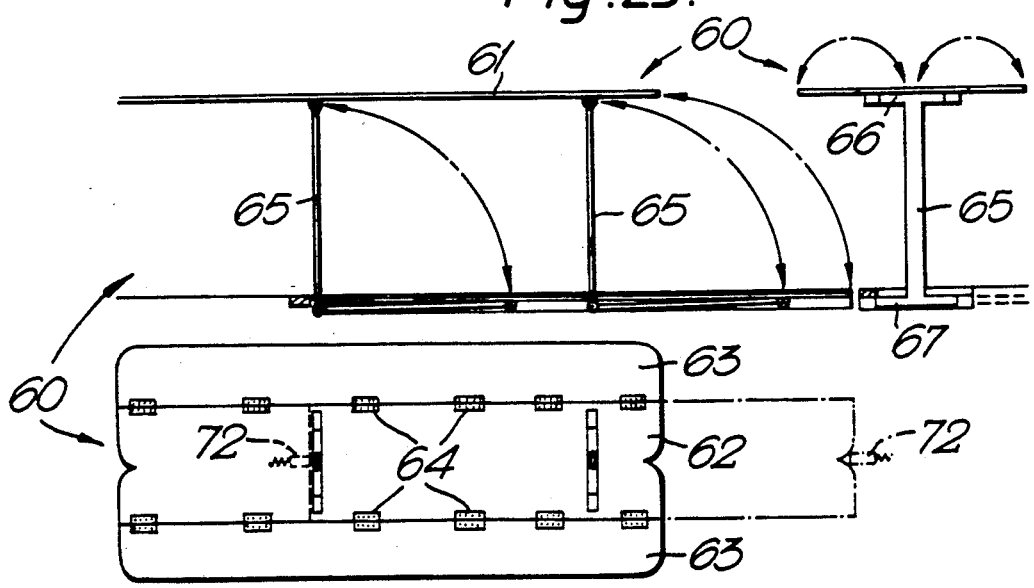
Figure 24:
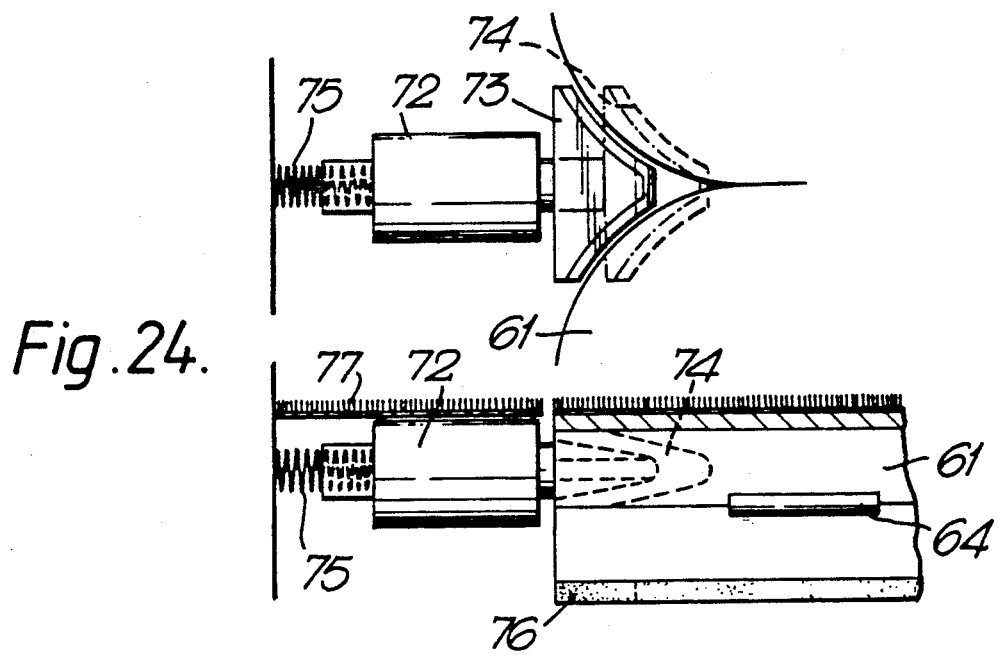
FIG. 24 shows a detail of the table in FIGS. 22–23.

Between the chairs 56 there is arranged a flap table 60 which can be set or fitted into the floor in a manner corresponding to that of the embodiment according to FIGS. 11 and 13. An embodiment of the flap table 60 is shown in FIGS. 22-24. The tabletop 61 consists of a center member 62 and a pair of flaps 63 hinged to the center member by means of a number of hinges 64. The tabletop is supported by a pair of columns 65 each having an upper transverse arm 66 rotatably mounted under the tabletop 61 and a lower transverse arm 67 rotatably mounted in a recessed position in the floor. The lower transverse arm 67 is rigidly connected to one end of a shaft 68 which is also suitably mounted in the floor. The other end of shaft 68 is fixed to the hub of a sector gear wheel 69 which is built into a wall portion 70 of the car. An electric motor 71 is coupled to the sector gear wheel 69 through a gear wheel (not shown) to drive the sector gear wheel between two extreme positions, viz. a position wherein the table is erected as shown in FIG. 22 and a position wherein the table is set or fitted into the floor. The sector gear wheel is provided with switches (not shown) for automatic stop in both positions. For safety reasons, the table 60 is erectable and collapsable only when the chairs 56 are in the position shown in FIG. 20. This may be arranged by having suitable contacts (illustrated in FIG. 22 and designated as 21 following the convention set forth in FIGS. 4A to 4C) in the chair bases that are connected to the feeding circuit of the motor 71. Such contacts preferably also are provided in the embodiment according to FIGS. 10-15.

A pair of electromagnets 72 are also arranged in the floor to maintain the table 60 blocked in the collapsed position. The arrangement is shown in more detail in the combined plan and side view in FIG. 24. Each electromagnet 72 has an armature with a blocking member 73 for engagement in a recess 74 in an adjacent end edge of the tabletop 61. The electromagnets 72 are normally not energized, and each blocking member then is held in engagement position by means of a spring 75. When the table is to be erected or collapsed, the magnets are energized so that they discontinue the blocking, and the magnets are automatically disconnected when the sector wheel 69 is stopped in the extreme positions. If something should prevent the table 60 from moving, the motor 71 is disconnected by means of a safety device (not shown), so that injury is avoided.

As shown in FIG. 24, a number of rubber gaskets 76 (only one is shown) are arranged between the underside of the table and the bottom of the recess in the floor, in order to prevent vibration of the table in the folded (putdown) position. Further, a carpet 77 is shown to cover the magnet means and the table. The part of the carpet covering the folded table suitably may be attached to the underside of the flaps 63 so that the cover faces upwards when the flaps are turned in onto the center member 62 of the table.

Figure 25:
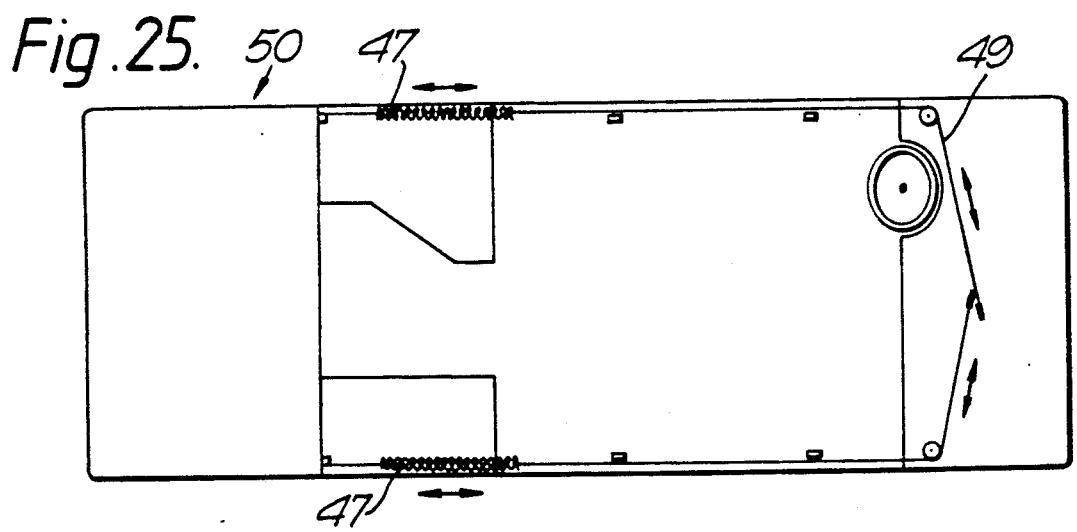
FIGS. 25 and 26 show the camping car in FIGS. 18–21 provided with a screening means of the same type as that in FIGS. 16 and 17.
Figure 26:
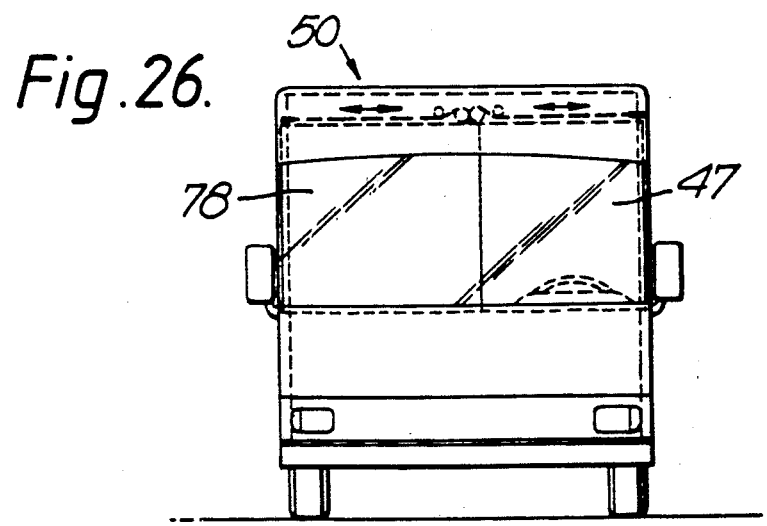

In a manner corresponding to that of FIGS. 16 and 17, the system in the camping car 50 is provided with a screening means in the form of a curtain 47 which is arranged to be drawn over the windows 78 of the car, as shown in FIGS. 25 and 26. As previously mentioned, an embodiment of such an arrangement will be further described with reference to FIGS. 41–43.

The system according to the invention in an advantageous manner also can be adapted for utilization in buses for long transport of persons, e.g. for charter tours for tourists. In such a bus the guide rails can be arranged as part of the coachwork, for example as vertical posts, along a central combined sleeping/sitting portion of the bus, with transversely extending double berths and a pair of juxtaposed seats mounted therebelow, and with e.g. a longitudinally extending passage at each side, i.e. between said center portion and the windowequipped side walls of the bus.

When utilizing the system in a bus it may be advantageous that it is provided with a berth which, in contradistinction to an ordinary sleeping berth, is in the form of a "drawer" with a possibly foldable stretcher, with a view to transport of a sick person, for instance if one of the passengers should get ill during the trip.

Figure 27:
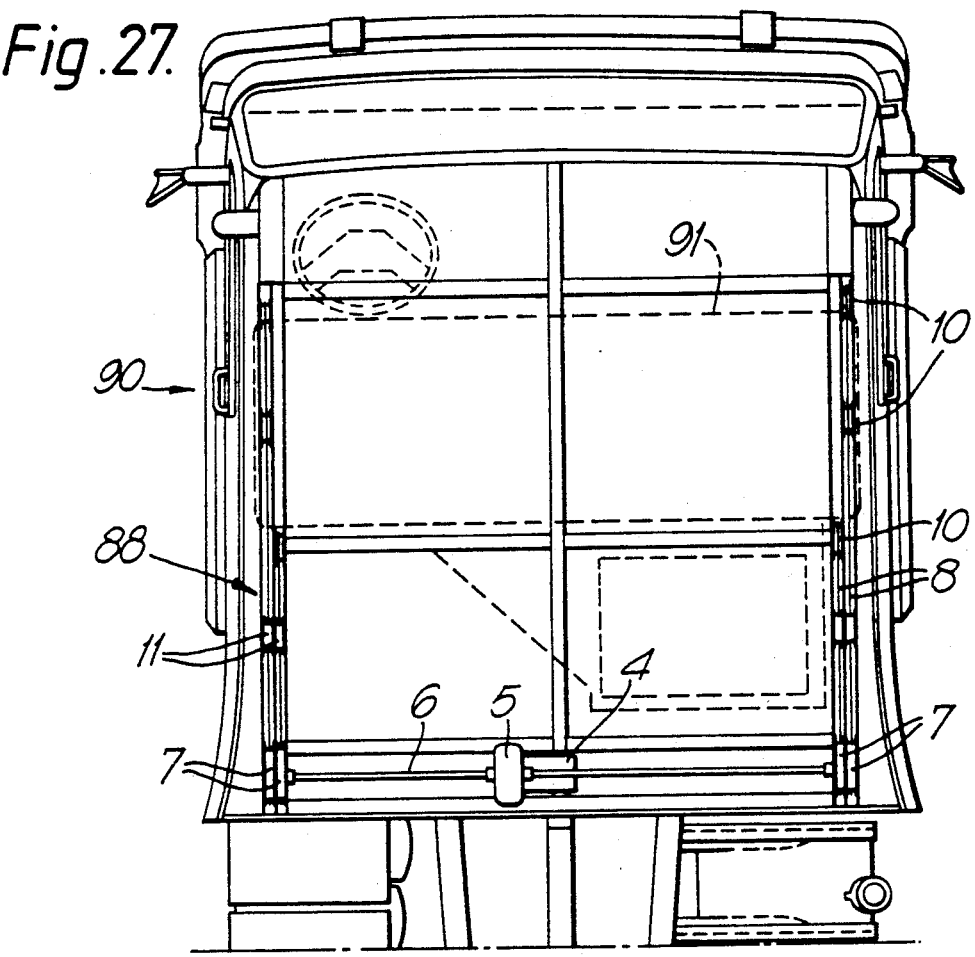
FIGS. 27–32 show schematic plan views, front views and side views, respectively, of an embodiment of the system according to the invention in a driver's cab for a lorry or a carriage train for long transport, FIGS. 30–32 showing the chair arrangement with both of the two berths in completely lowered position.
Figure 28:
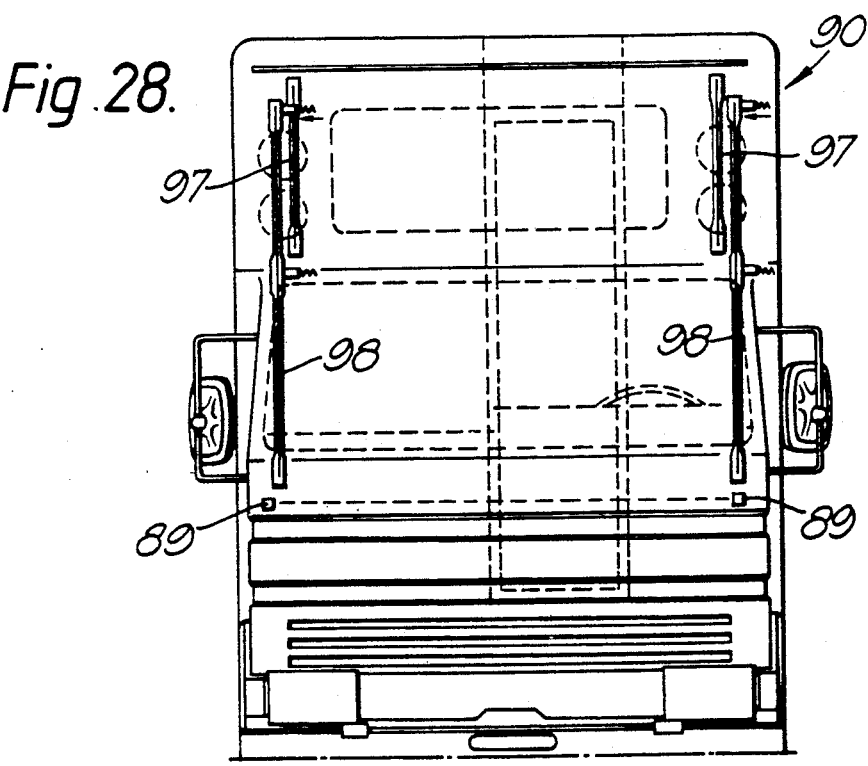
Figure 29:
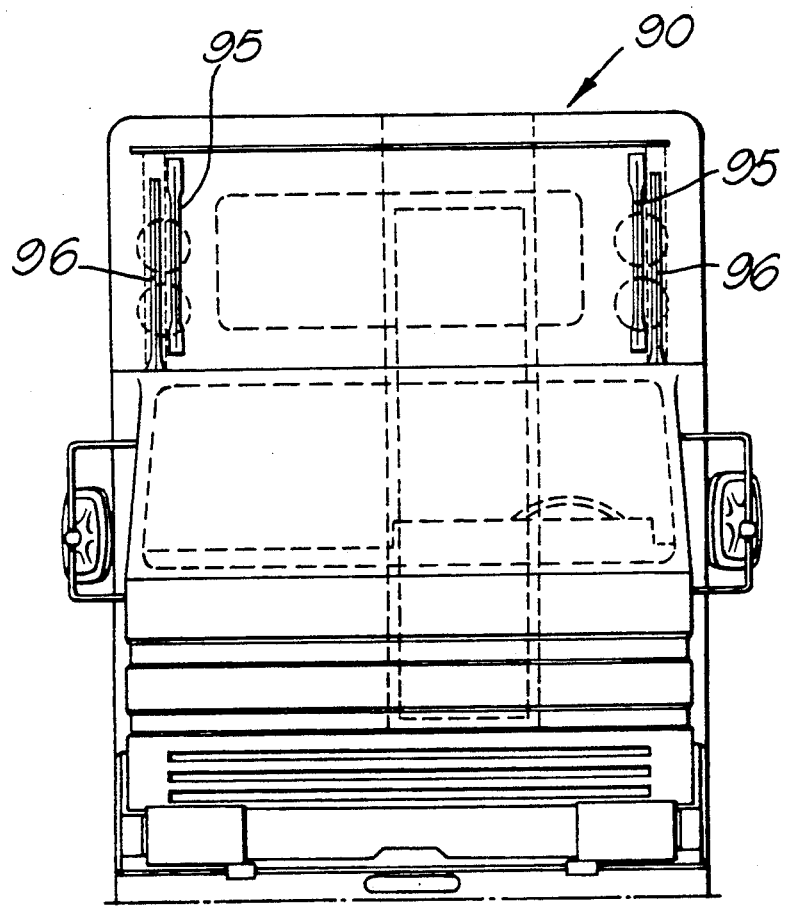
Figure 30:
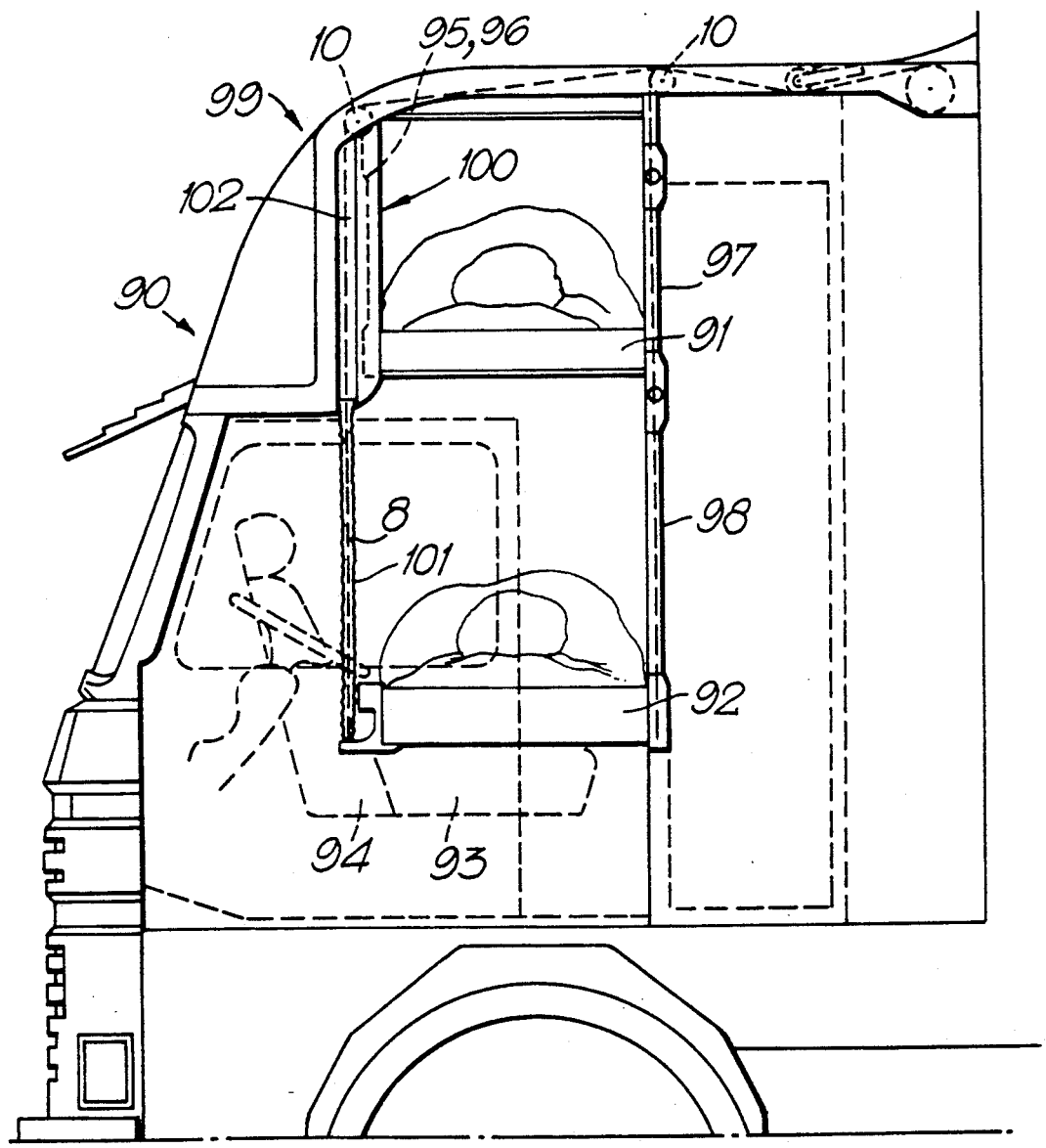
Figure 31:
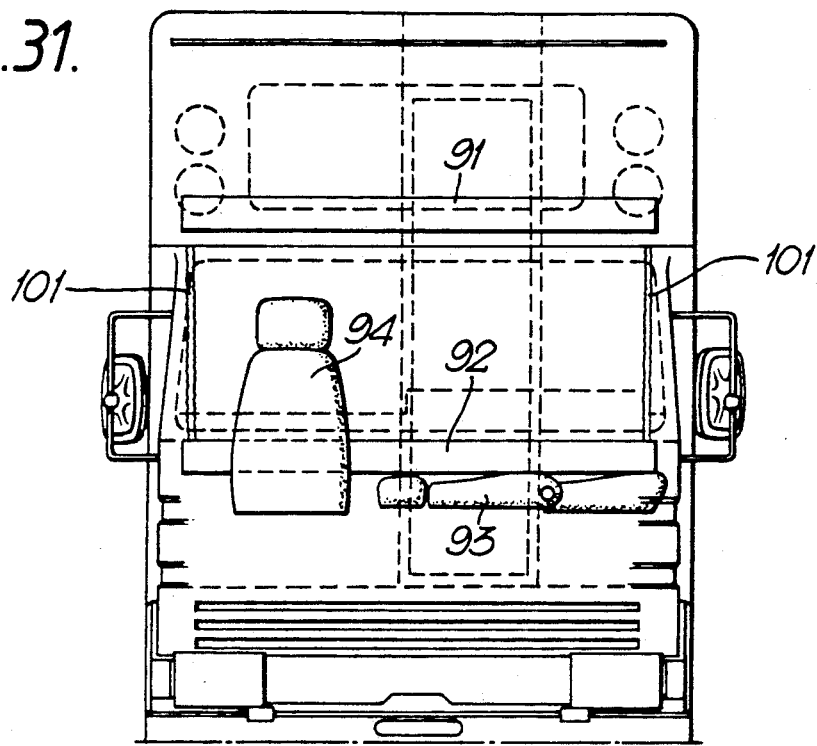
Figure 32:
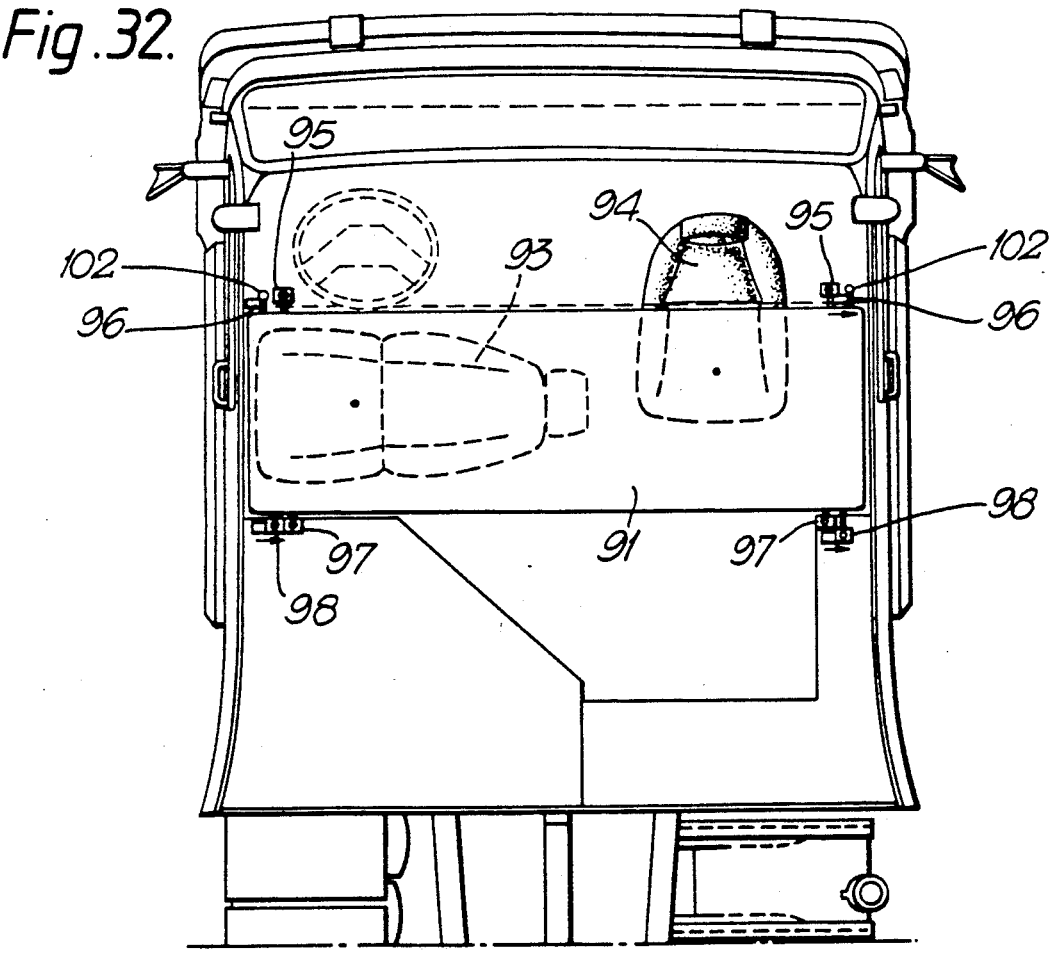

FIGS. 27–32 schematically show an embodiment of the system according to the invention installed in a driver's cab 90 of a lorry or a "carriage train" for long transport. As shown in FIGS. 30–32, the system in the illustrated embodiment includes a pair of transversely extending berths 91, 92 arranged one above the other. The berths are mounted in the space above the driver's seat 93 and the side seat 94 and are guided by respective guide rails 95, 96 and 97, 98 extending along the side walls of the driver's cab, the driver's chair 93 being pivotable and foldable and the side chair 94 being at least pivotable to give room for the lowering of the lowermost berth 92 to the lower position (the night position). The berths are raisable and lowerable from a frame structure 88 arranged in the roof. As shown in FIG. 27, the frame structure 88 comprises a number of longitudinally and transversely extending beams and in principle is constructed in the same manner as the frame 1 in FIG. 1. Thus, the frame structure supports a reversible motor 4 with associated gearbox 5, a shaft 6 with associated reels 7, wires 8 running over pulleys 9, and spring-loaded pulleys 11 for tightening the wires. The wires 8 are fastened to the lowermost berth 92, so that the upper berth 91 rests on the lower berth 92 when the berths are in the raised position, in a manner similar to that of the embodiment in FIGS. 6–9.

Even if the motor with associated transmission means in the embodiment in FIGS. 27–32, and also in the other previously described embodiments, are located in the roof, these elements of the system readily may be arranged at a lower location, with a view to achieving a lower center of gravity for the car, boat, etc. in its entirety. As regards the berths proper, these may e.g. be made of a light metal, such as aluminum, so that they may be very light of weight, and do not have any substantial influence on the location of the center of gravity.

FIGS. 28 and 29, compared with FIG. 32, illustrate how the forward guide rails 95, 96 and the rearward guide rails 97, 98 are placed in the driver's cab 90. It further appears that the rails at the end points and in the middle of the long rearward rail are provided with enlarged portions which are of a design corresponding to that mentioned in connection with FIG. 7. As mentioned in connection with FIG. 7, the arrangements in connection with these enlarged portions will be further described with reference to FIGS. 45–51. (It should be noted here that also the guide rails in the previously mentioned embodiments in connection with a pleasure boat and a camping car are presumed to be of a similar construction, such as those suggested with dashed lines in FIGS. 14 and 19.) FIG. 28 also shows a pair of photocells 89 arranged for automatic stop of the lower berth 92 in the lower position.

As shown in FIG. 30, the driver's cab 90 has a top portion having a large headroom, the driver's cab being elevated by a superstructure 99 in the region traditionally used for roof spoiler means. Thus, the superstructure here forms a roof spoiler, at the same time as it has for its main task to provide space for the berth arrangement. In the region in the front of the berths, the superstructure is provided with a padded wall 100. This gives a great safety for the resting driver when he is lying in the upper berth during driving.

From FIG. 30 it further appears that the lower berth 92 in the lower half of its range of movement mainly is guided only by the rearward rail 98, the berth at the front only being suspended in the wires 8 which are shown to be covered by a protecting "hose" 101. This suitably may consist of a rubber-coated spring. When the lower berth 92 is in a raised position, the protecting hoses 101 are received in respective channels 102 in the padded front wall of the superstructure (see also FIGS. 31 and 32).

Figure 33:
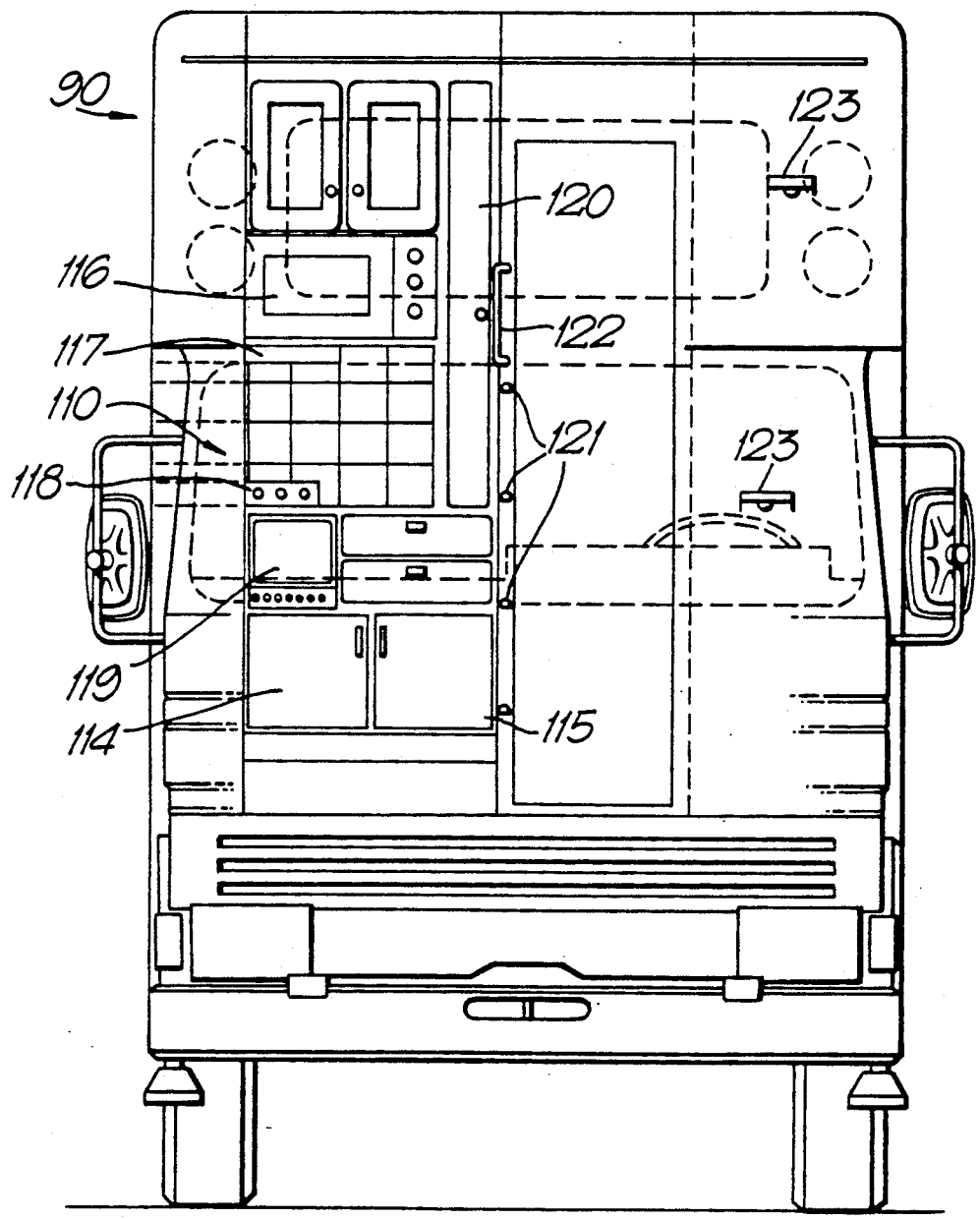
FIG. 33 shows a partly sectioned front view of the driver's cab in FIGS. 27–32 with an example of a kitchen arrangement.
Figure 34:
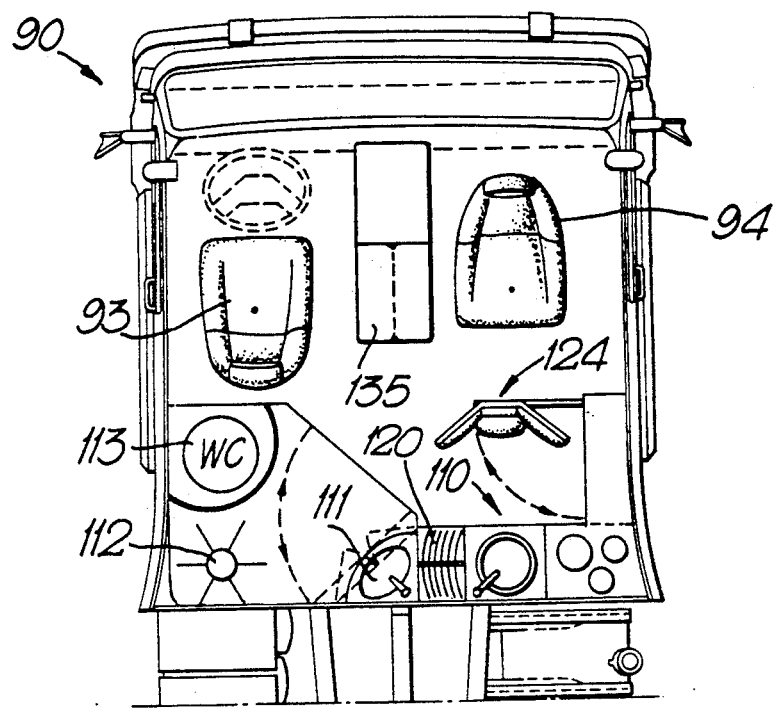
FIGS. 34 and 35 show a plan view and a side view, respectively, of the driver's cab in FIG. 33 with a kitchen, a water closet and a shower section, and with a safety arm for personal protection during food preparation.
Figure 35:
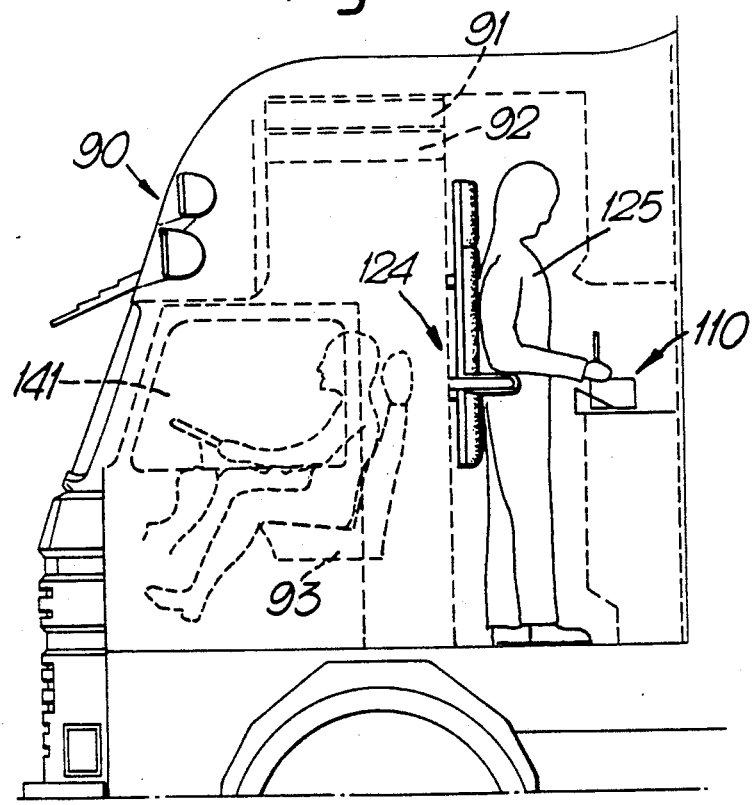

FIG. 33 shows a partly sectioned front view of the driver's cab 90 and shows an example of a kitchen arrangement 110 in the rearward part thereof. FIGS. 34 and 35 show a plan view and a side view, respectively, of the kitchen arrangement 110, and furthermore a water closet (WC) and shower section having a sink 111, a shower 112 and a closet 113. The system according to the invention permits installation of said units when the driver's cab is extended rearwards with only ca. 30 cm in relation to a driver's cab of conventional design, i.e. with berths arranged in the region behind the seats. An alternative arrangement which includes fewer units, e.g. mainly a boiling plate and a sink, advantageously can be used in a shorter driver's cab, i.e. a cab of usual length which has not been extended rearwardly.

In the example in FIG. 33 there are, as an example, shown a freezer 114, a refrigerator 115, a microwave oven 116, and an exhaust fan 117 above a boilingplate unit 118. There are further shown a TV/video unit 119, a wardrobe 120, ladder rungs 121 and a handle 122 for use when ascending to the upper berth 91, and reading lamps 123 for the upper and lower berths. The units 121–123 are mounted on the shower-section wall.

Figure 36:
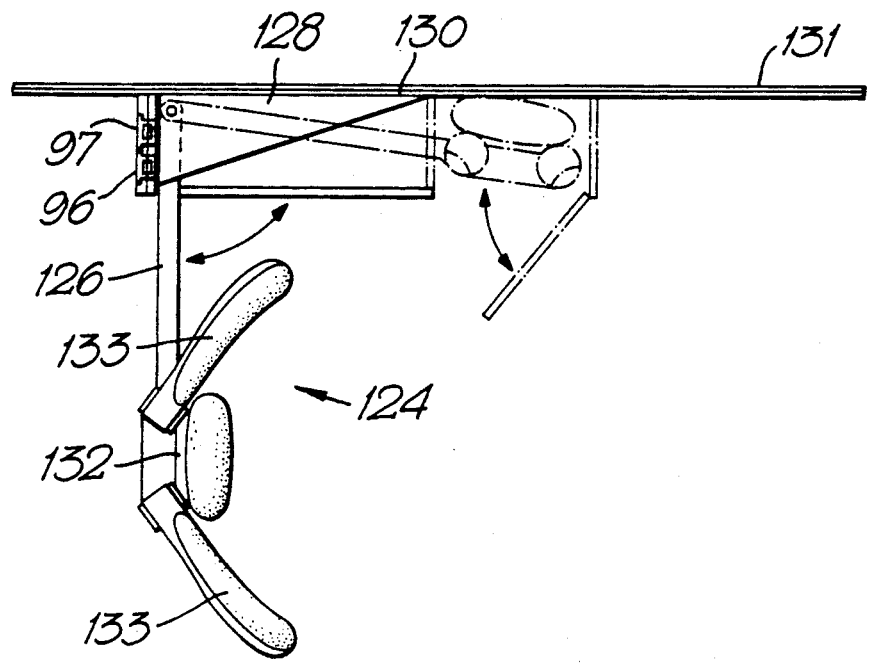
FIG. 36 shows a plan view of the safety arm.
Figure 37A:
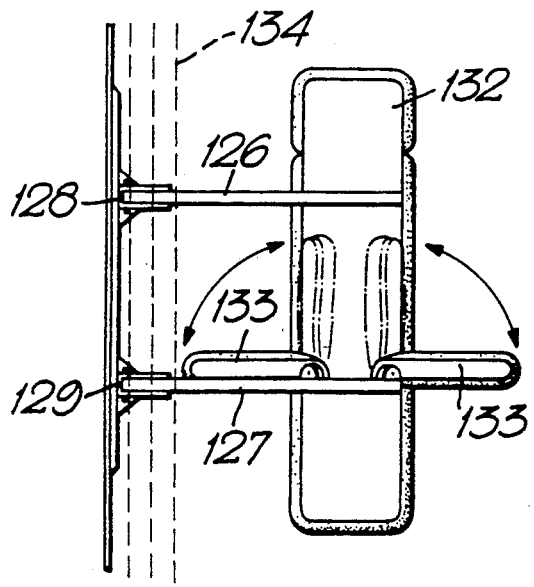
FIG. 37A shows a side view of the safety arm as viewed from the left side of FIG. 36.
Figure 37B:
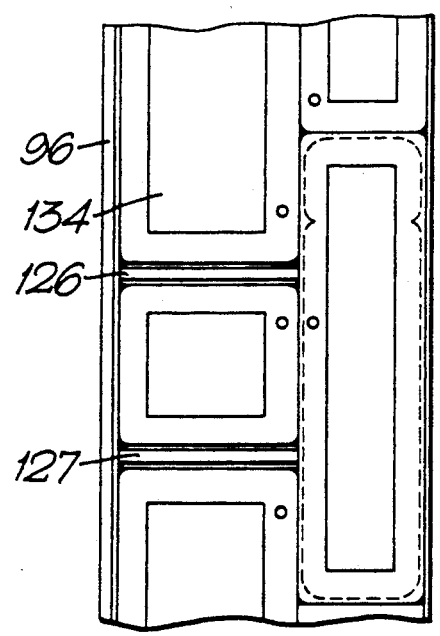
FIG. 37B shows a side view of the safety arm, as turned into and essentially concealed in the cupboard and a side wall of a driver's cab.

FIGS. 34 and 35 also show a safety arm device 124 for protection of a person 125 in the illustrated manner in case of food preparation during driving. This safety device is shown in more detail in FIGS. 36–37. The device consists of an upper and a lower steel arm 126 and 127, respectively, which are pivotally mounted in respective holding brackets 128, 129 fastened to a steel plate 130 which is fastened to the outer wall 131 of the driver's cab. To the outer ends of the steel arms there is fastened a safety arm in the form of a vertically extending safety and supporting plate 132 which is padded as shown in FIG. 36. At the outer end of the lower steel arm 127 there are rotatably fastened padded arm rests 133 which, from the operative position in FIG. 36, can be turned up behind the supporting plate 132 as shown in FIG. 37A. When the arm rests 133 are in the turned-up position, the steel arms with the supporting plate 132 can be pivoted inwards against the driver's cab wall, as shown with dashed lines in FIG. 36, and thus be removed from the floor surface of the driver's cab. In this position the device broadly can be concealed in a cupboard having a number of cupboard doors which together form a cupboard wall surface 134, as shown in FIG. 37B.

Figure 38:
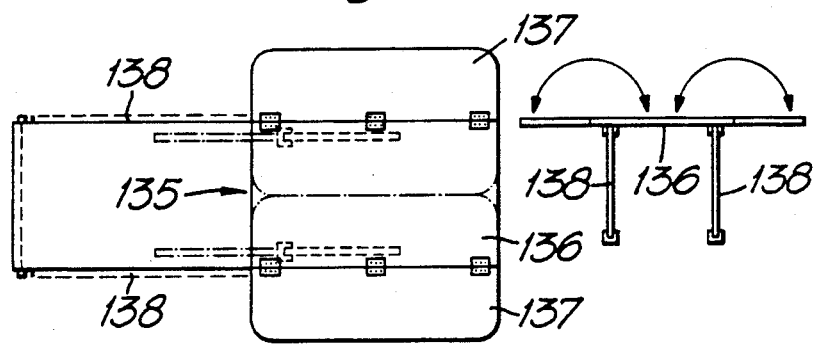
FIGS. 38 and 39 show schematic plan, end and side views of a dining table arranged in the driver's cab as shown in FIG. 34.
Figure 39:
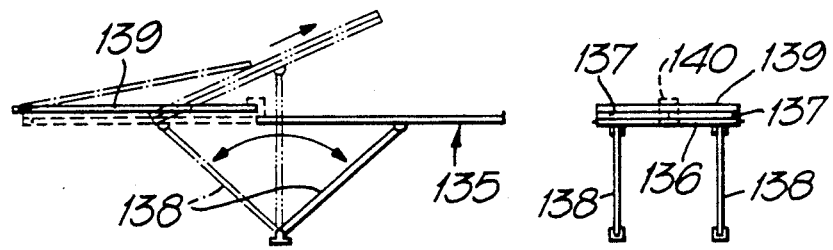

As shown in FIG. 34, a dining table 135 is arranged between the chairs or seats 93, 94 in the driver's cab 90. An embodiment of this table is schematically shown in FIGS. 38 and 39. The table is attached to the instrument panel between the chairs and is a flap table having a center member 136 and a pair of hinged flaps 137. A pair of legs 138 is pivotally attached to the underside of the center member. In FIG. 38, the table 135 is shown in an extended position where it is pulled a distance rearwards from the instrument panel. In the folded position the table can be pushed back along sliding grooves 138 and underneath a cover plate 139 which is hinged at its inner end to enable tilting-up of the plate as shown with dashed lines in FIG. 39, when the table is pulled out or pushed in. A locking mechanism 140 is provided to prevent rattling when the table is folded and inserted under the cover plate 139.

Figure 40:
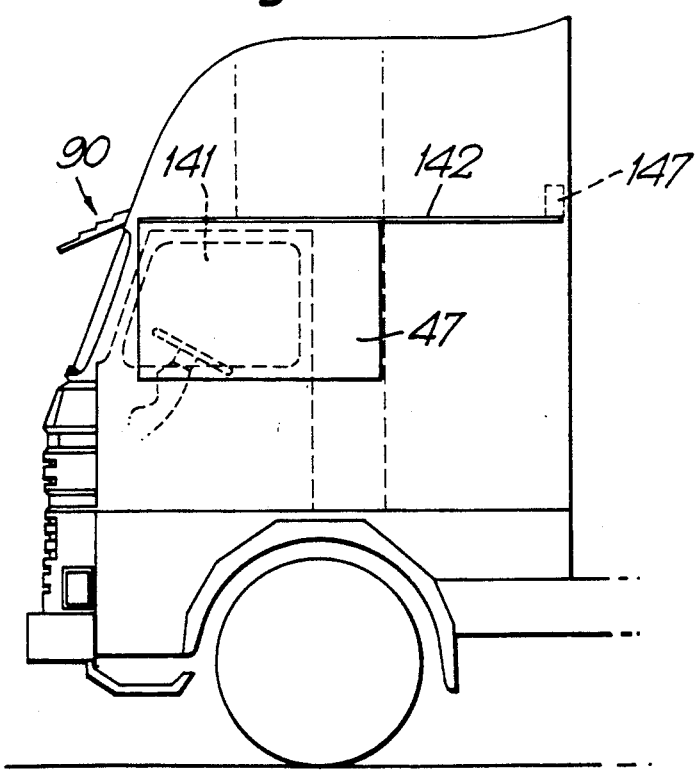
FIGS. 40 and 41 show a curtain screening arrangement for the driver's cab windows and of the same type as that in FIGS. 16, 17 and 25, 26.

In a manner similar to that of FIGS. 16 and 17 and FIGS. 25 and 26, the system in the driver's cab 90 is provided with a screening means in the form of a curtain 47 which, as required, can be drawn over the windows 141 of the driver's cab, as shown in FIG. 40. The curtain arrangement is shown in more detail in FIGS. 41–43.

Figure 41:
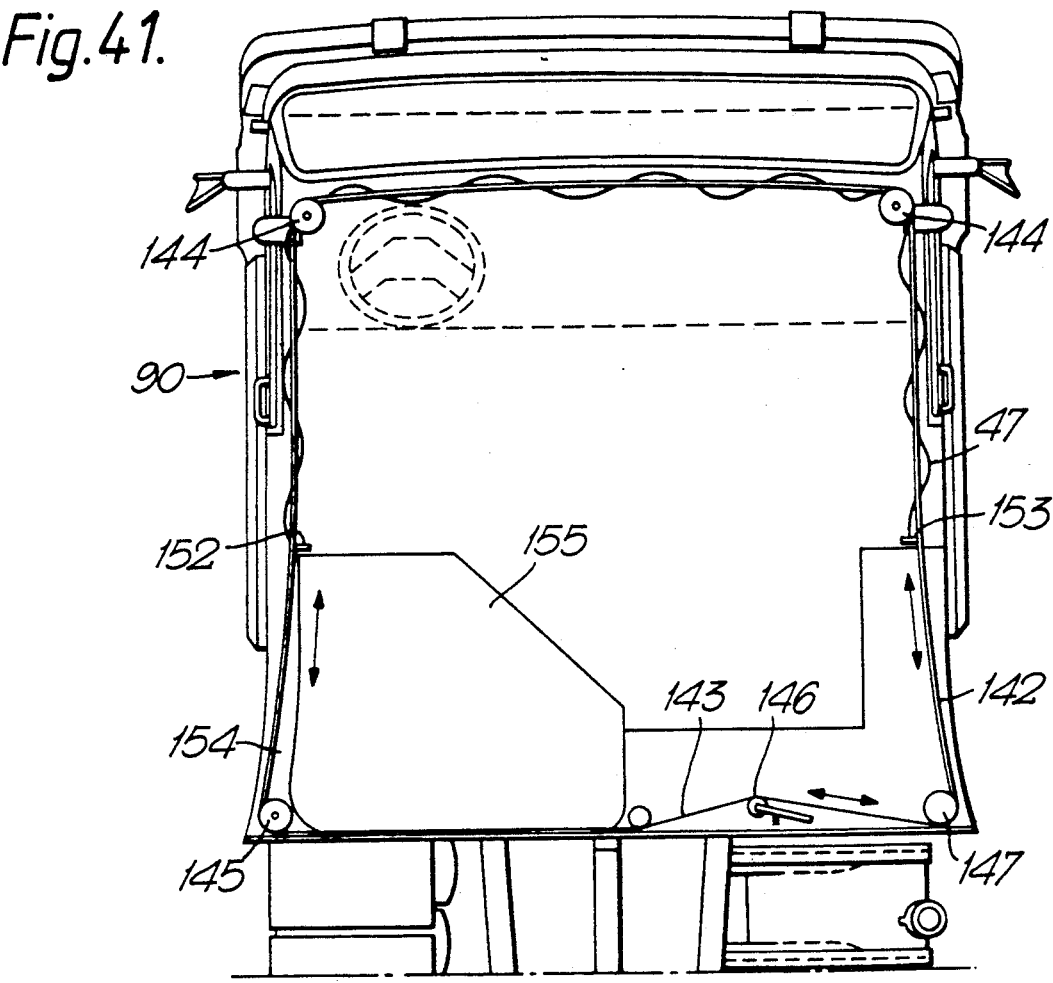
Figure 42A:
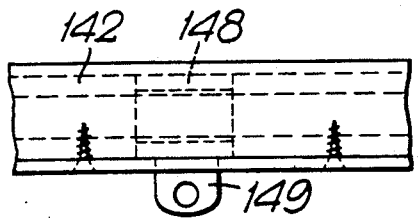
FIGS. 42A to 42D show details of the FIG. 41 curtain arrangement.
Figure 42B:
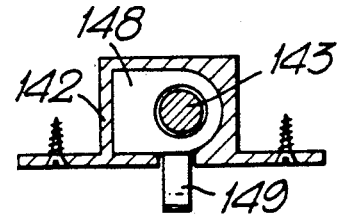
Figure 42C:
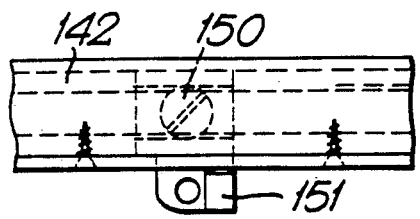
Figure 42D:
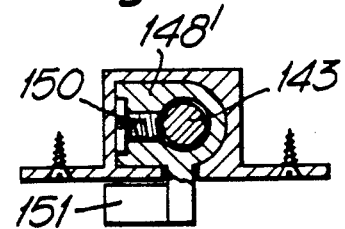

As shown in FIG. 41, a tubular rail 142 (e.g. of aluminum) extends along the side walls and front wall of the driver's cab 90. A wire 143 extends within the rail 142 along the whole length of the rail and moreover along the rear wall of the driver's cab, the wire running over pulleys 144 in the forward corners of the driver's cab 90 and over a pulley 145 in the rearward corner, and further being kept tight by means of a spring-loaded pulley 146. In the other rearward corner of the driver's cab there is provided a reversible motor 147 which is arranged to pull the wire loop in one or the other direction. The curtain 47 is attached to a number of sliders 148 which are slidably displaceable along the rail 142. The sliders for curtain attachment have a depending lug 149 projecting downwards through a groove extending along the underside of the rail as shown in FIGS. 42A–D. The sliders 148 are also slidable on the wire 143 except for the slider at one end of the curtain. This slider 148' is fastened to the wire by means of a fastening screw 150. This fixed slider is provided with a cam 151 which is arranged to cooperate with a pair of stop switches 152, 153 marking the end points of the curtain

47 in drawn condition, as shown in FIG. 41. The motor 142 stops drawing the curtain when the cam 151 actuates the stop switch 153. When drawing back the curtain, the motor stops when the cam 151 actuates the stop switch 152. The curtain then is stored in a folded-up concealed condition in the compartment 154 shown in FIG. 41 between the outer wall of the driver's cab and the adjacent wall of the WC and shower section 155.

Figure 43:
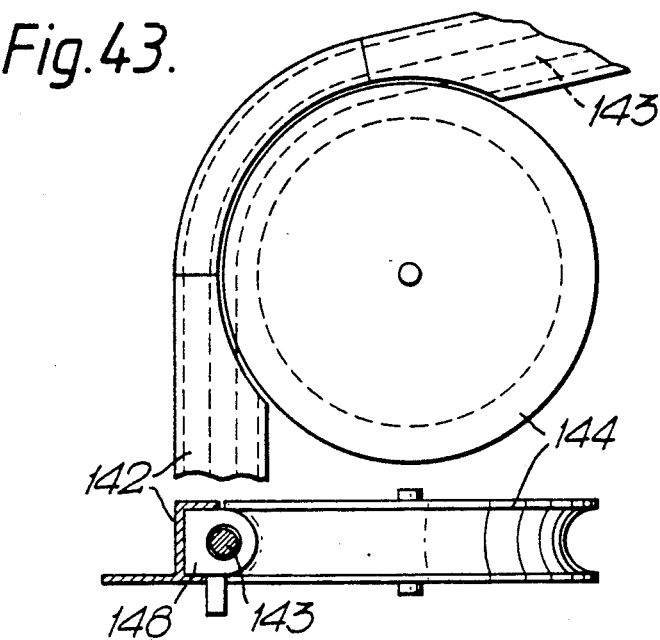
FIG. 43 shows another detail of the FIG. 41 curtain arrangement.

FIG. 43 shows an enlarged detail of the pulley 144 in one of the forward corners of the driver's cab, and shows how a portion of the rail 142 is removed in the corner region to cooperate with the pulley when the sliders 148 pass the pulley.

The aforementioned, enlarged or widened portions of the guide rails and the guide and switch means in association with these portions will be further described below.

In the embodiments shown in FIGS. 44–51, the guiding bodies of the berths consist of sliders which are slidable in grooves in the guide rails. Thus, in FIGS. 44 and 45, there is shown a guide rail 160 having laterally projecting flanges 161 for attachment to the base. The guide rail 160 further has a longitudinally extending groove 162 for receiving a slider 163. The slider is connected to the current berth 164 through a slider arm 165 projecting from the berth. The flanges 161 of the rail are secured to the base by means of screws. The rail is concealed by a wall covering 166 which is split along the path of movement of the slider arm. Along the split of the rail are mutually adjacent edge portions formed by packings or edge lips 167 of resilient or yielding material. Thus, the edge portions abut tightly against each other apart from where the edges are forced away from each other by the slider arm 165.

FIG. 46 shows a guide rail 170 having a widened lower end portion 171 which is lined with a rubber packing 172. The inner cavity of the packing is adapted to the shape of the slider 173, so that the slider is secured or retained in a stable and noiseless manner when it is located in the widened portion. The wire 8 for raising and lowering of the berth 174 in question is concealed as it passes through the rail in the inner passage thereof; and, as shown in the Figure, the wire passes through a hole in the slider 173 and is attached thereto by means of four screws 175. On the lower end of the rail 170 there is provided a switch 176 which is actuated by the slider 173 in the lower position thereof, for automatic stop of the berth-lowering motor when the berth is in the lowered position. The end portion 171 of the rail 170 may e.g. correspond to the lower end portion of the rails 97 in FIG. 28, apart from the fact that there is no wire 8 used. The lower end portion of the rails 98 in FIG. 28 may have a corresponding configuration, but is without the switch 176. The upper end portion of the rails 97 in FIG. 28 may also have a corresponding configuration as that shown in FIG. 46, but without the wire 8. A switch corresponding to the switch 176 is provided at the top of the rail to stop the motor when the berths 91, 92 are in the upper raised position.

FIG. 47 shows a guide rail 180 having an enlarged portion 181 for receiving a rubber packing 182 having a cavity which is adapted for stable reception of the slider 183. In addition, there is provided a holding means comprising an electromagnet 184 having a spring 185 which, in the deenergized condition of the electromagnet, forces a rubber-coated block 186 against the slider to better ensure that vibration and rattle during driving are avoided. Further, there is provided a switch 187 mounted on the rail 180 and having a switch-actuating, operating arm 188 which is pivotally attached to the rail and which is actuated by the slider 183 when it passes the widened portion 181. When the switch 187 is actuated by the slider, the electromagnet 184 is energized so that it removes the block 186 from the slider against the force of the spring 185. The widened portion 181 may e.g. correspond to the widened portion in the middle of the rails 98 in FIG. 28.

Figure 48:
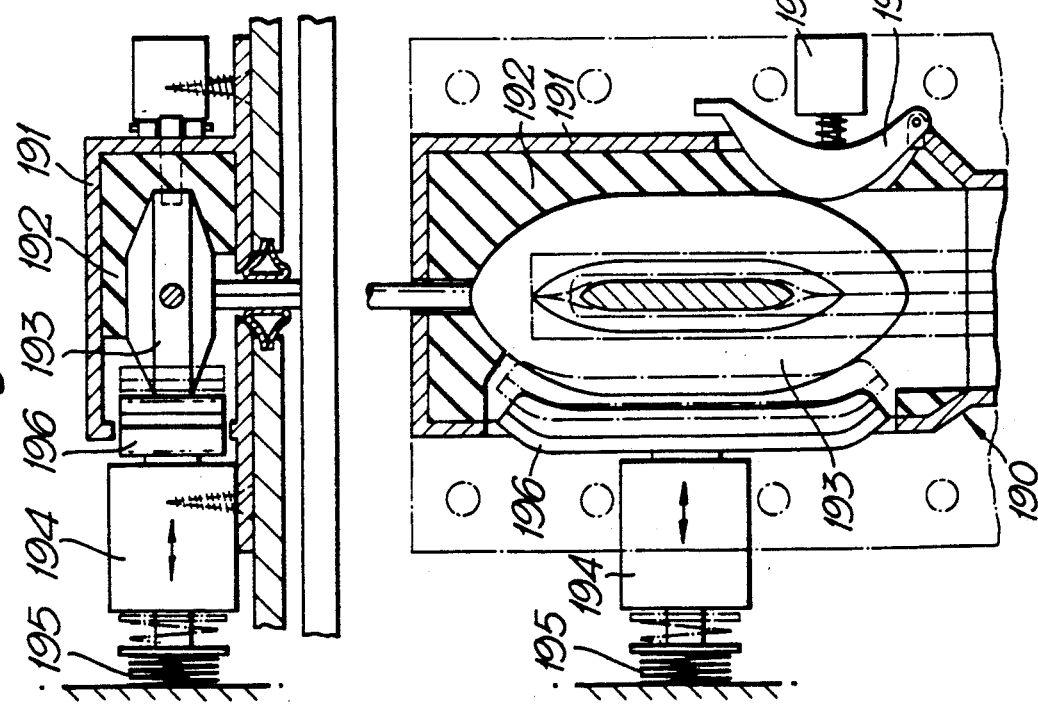
FIG. 48 shows a longitudinal section a cross-section of an upper end portion of a guide rail with a guiding body and a holding means.

FIG. 48 shows a guide rail 190 having a widened upper end portion 191 which is lined with a rubber packing 192 having a cavity adapted for stable reception of the slider 193. Further, there is provided an electromagnet 194 assisted by a spring 195 to actuate a rubbercoated block 196 in a manner corresponding to that of the embodiment in FIG. 47. A switch 197 having an operating arm 198 and operating in the same manner as the corresponding elements in FIG. 47 is also provided. The end portion 191 may e.g. correspond to the upper end portions of the rails 98 in FIG. 28. A corresponding configuration of the upper end portion may be used in the guide rails in the system for a pleasure boat (FIG. 14) and a camping car (FIG. 19). On the top of the rail there will in addition be provided a switch (not shown) which is arranged to be actuated by the slider to stop the motor when the berth is in the raised position.

Figure 44:
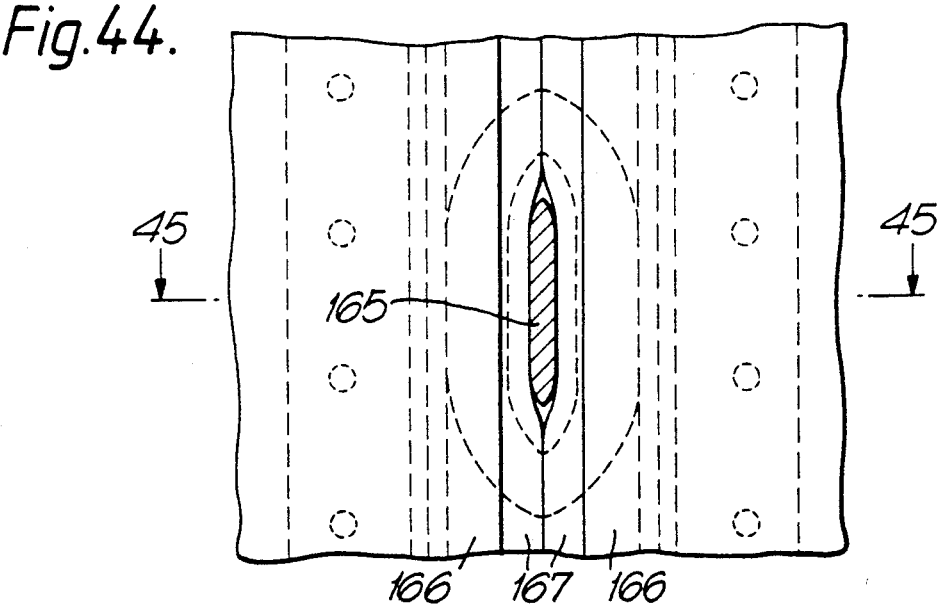
FIG. 44 shows a side view of a segment of a guide rail having a berth-guiding body slidable therein along the line 44—44 in FIG. 45.
Figure 45:
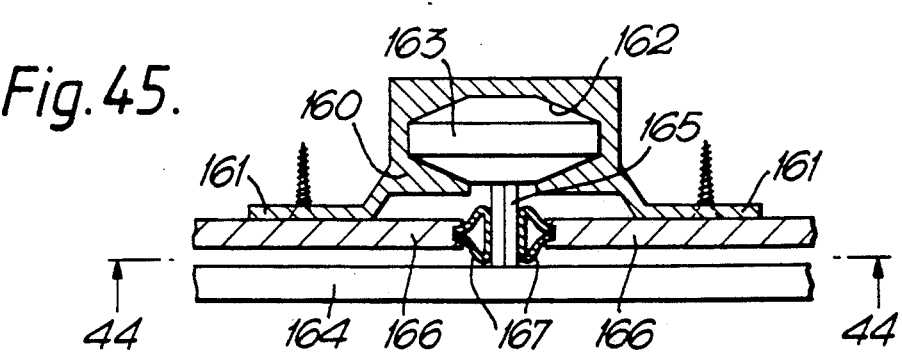
FIG. 45 shows a section along the line 45—45 in FIG. 44.
Figure 49A:
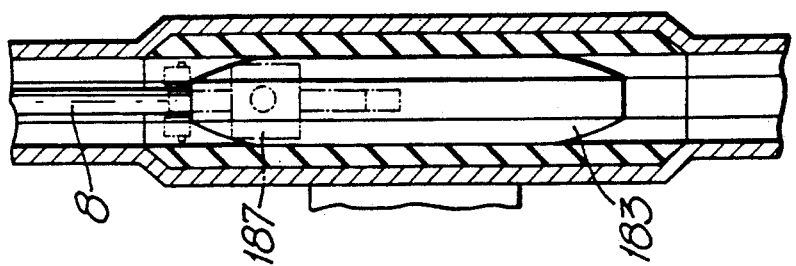
FIGS. 49A, 49B and 49C show sectional views of guide rails with guiding bodies according to FIG. 44, FIG. 46 and FIG. 48, viewed from the side.
Figure 49B:
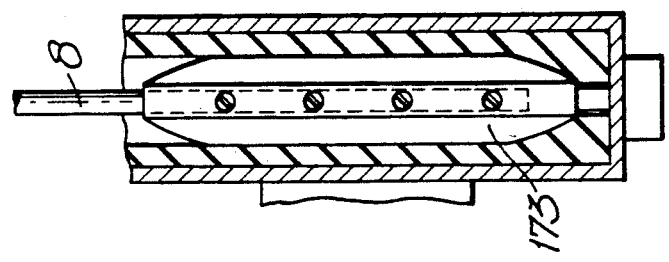
Figure 49C:
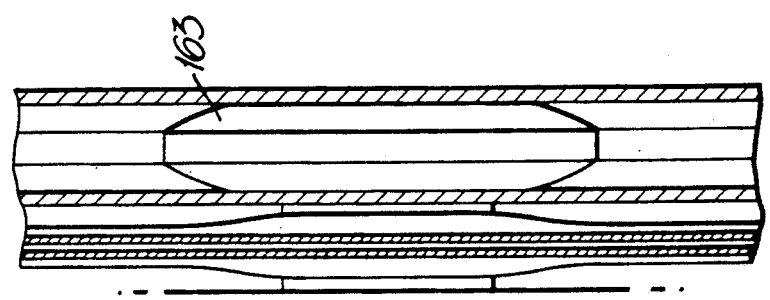
Figure 50:
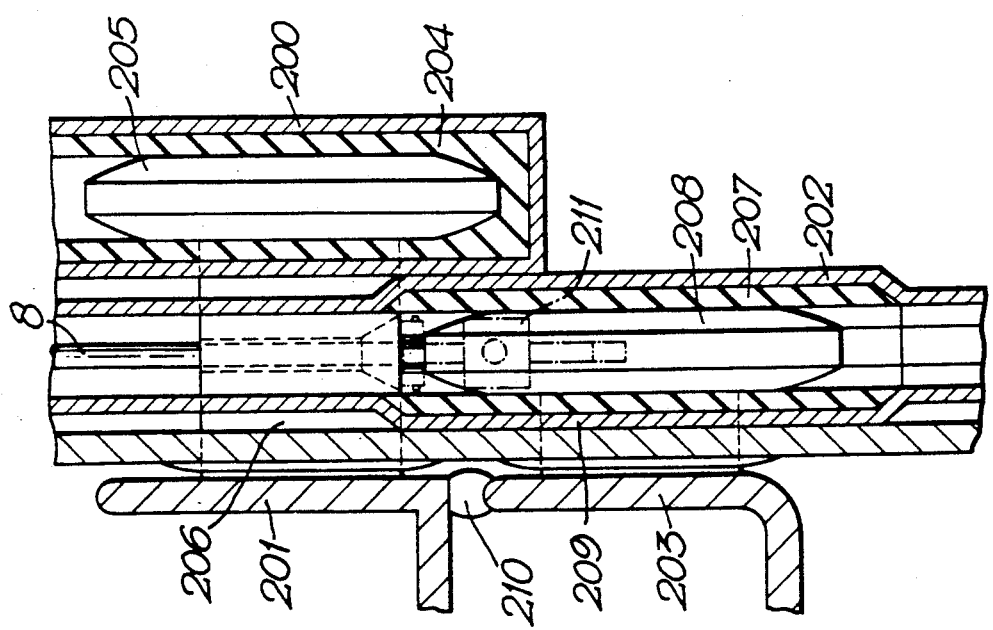
FIG. 50 shows a longitudinal section, viewed from the side, of a double rail with sliding bodies for, e.g., a railway compartment or a boat cabin.

FIGS. 49A, B and C show the slider embodiments viewed from the side, more specifically the slider 163 in FIG. 44, the slider 173 in FIG. 46 and the slider 183 in FIG. 47.

FIG. 50 shows a longitudinal section viewed from the side of a double-rail embodiment for a railway compartment or a boat cabin that may be used e.g. for the guide rails 34 in FIG. 7. The Figure shows a widened, lower end portion 200 of a short guide rail for the upper berth 203 (30 in FIG. 7), and a widened central portion 202 of a long guide rail for the lower berth 203 (31 in FIG. 7). The end portion 200 contains a rubber lining 204 for the upper berth slider 205 which is connected to the berth 201 through a slider arm 206. The widened portion 202 contains a rubber lining 207 for the lower berth slider 208 which is connected to the berth 203 through a slider arm 209. When the berths are raised from the shown position, the slider 208 of the lower berth is raised (by means of the wire 8) to engagement with the slider arm 206 of the upper berth, so that both berths are lifted in case of continued traction in the wire 8. As suggested in the Figure, a suitable packing 210, e.g. of rubber, is provided between the two berths in order to absorb vibrations and prevent rattle. A similar packing (not shown) is provided between the upper berth and the roof. It is to be noted that similar packings according to requirements will be provided in the different system embodiments. It appears from the Figure that the long rail is also provided with a switch 211 corresponding to the previously mentioned switches 187 and 197 in FIG. 47 and FIG. 48, respectively.

FIG. 51 at the top shows a cross-section viewed from above and a fragmentary front view of the embodiment in FIG. 50. The cross-section shows how the two rails are coupled to a double rail 212, which is provided with fastening flanges 213 and surrounded by a casing 214.

The switch arrangement in the driver's cab 90 will be described below in connection with the embodiments described above in connection with FIGS. 46–48.

When raising the berths 91, 92 from a lowered position, a first switch button (not shown) is depressed to start the berth motor 4. When the lower berth 92 approaches its upper position, the switch 197 in each of the rails 98 energizes the electromagnet 194 to discontinue the spring force on the holding block 196 just before the slider 193 arrives at its uppermost position. The switch provided on the top of each of the rails 97 for the upper berth 91 provides for stop of the motor and therewith stop of the berths in the uppermost position. This switch also deenergizes the electromagnet 194, so that the spring 195 thereof forces the holding block against the slider 193 of the lower berth for retention thereof. Said first switch button also controls the electromagnets 184 in the central portions of the rails 98, but it is not connected to the photocells 89 at the lower edge of the rails when the berths are in the lowermost position.

When the upper berth 91 is to be lowered to the sleeping position (night position), a second switch button (not shown) is depressed, so that each of the upper electromagnets 194 of the rails 98 is energized at the same time as the berth motor 4 starts lowering the lower berth 92 and therewith the upper berth 91 which is resting on the lower berth. When the lower berth approaches the sleeping position, the electromagnets 184 at the widened central portions of the rails 98 are connected by means of the switches 187. The switch 176 at the lower end point of the rails 95 is actuated by the slider 173 of the upper berth to interrupt the current to the motor at the same time as the electromagnets 184 are disconnected to stop the berths and retain the sliders by having the springs of the electromagnets press the holding blocks against the sliders. As the springs press against the sliders in the same direction, the packings between the berths are placed in such a manner that both berths are held against the rubber linings in the rails, so that rattle is avoided. For safety reasons it is an advantage that said second switch button is placed on the instrument panel, so that the driver will be aware that a berth lowering is to take place, and thus will not be distracted from driving.

When the lower berth 92 is to be lowered to its lowermost position (the night position), a third switch button (not shown) is depressed to energize the electromagnets 184 at the same time the berth motor is started to lower the lower berth. The photocells 89 placed at the lower ends of the rails 98 provide for automatic stop of the berth 92 in the lowermost position. The photocells 89 also deenergize the electromagnets 184. The photocells also provide a safety switch to stop the motor automatically when the light against the photocells is interrupted, as for example, if anything should come into the path of the berth when it is being lowered.

In the different embodiments illustrated and described above there is presupposed a suitable electrical wiring interconnection of the different switches, electromagnets and contacts operating in the system in cooperation with the motor for raising and lowering of the berths. This electrical wiring is not further shown and described since a person skilled in the art readily will appreciate how it may be arranged in each case in order for the system to operate in the stated manner.

It is obvious that the illustrated and described embodiments can be combined, varied or modified in different manners without departing from the scope of the invention, both as regards detailed embodiments and as regards the number of berths used and the number and arrangement of sitting means below the berth or berths. As regards safety measures, there will in practice advantageously be provided a means ensuring that a lowered berth cannot be raised to the storage position as long as a person is lying on the berth. Such a means may, for example, consist of an overload protection providing for automatic disconnection of the berth motor when the weight of the berth to be raised exceeds a certain limit, e.g. 10-15 kilograms over the normal weight.

Figure 52:
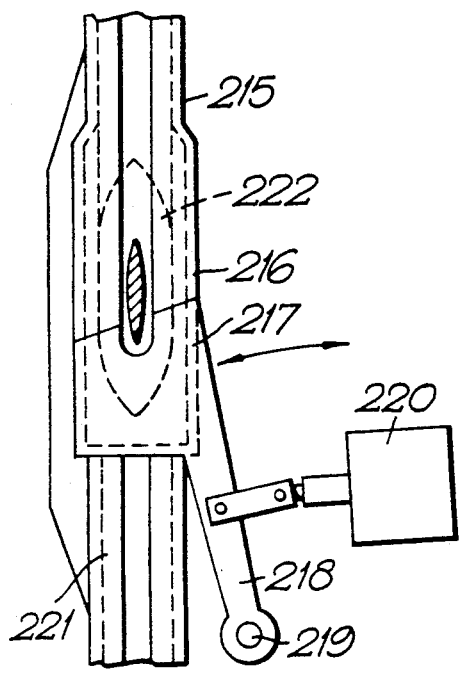
FIG. 52 shows a sectioned side view of the lower end portion of a guide rail having a split holder.

When utilizing the system in railway compartments or the like, wherein double berths are arranged as described in connection with FIGS. 6-9, it may be advantageous that the upper berth can be lowered to a position lower than the normal service or night position, for the purpose of making it more easy for service personnel to make the berth after use. To this end the holding means for the sliders of the upper berth may be divided, e.g. as shown in FIG. 52. The Figure shows a guide rail 215 having an enlarged lower end portion 216 with a split holder having a lower holder member 217 movable and fixed to a pivot arm 218. The arm is pivotable about a stationary pivot 219 and is operable by means of an electromagnet 220. When activating electromagnet, the arm 218 is pivoted to the right in the Figure, so that the holder member 217 is moved out from its stable seating on the rail extension 221 and the slider 222 of the upper berth can move further downwards along the rail extension.

Figure 53:
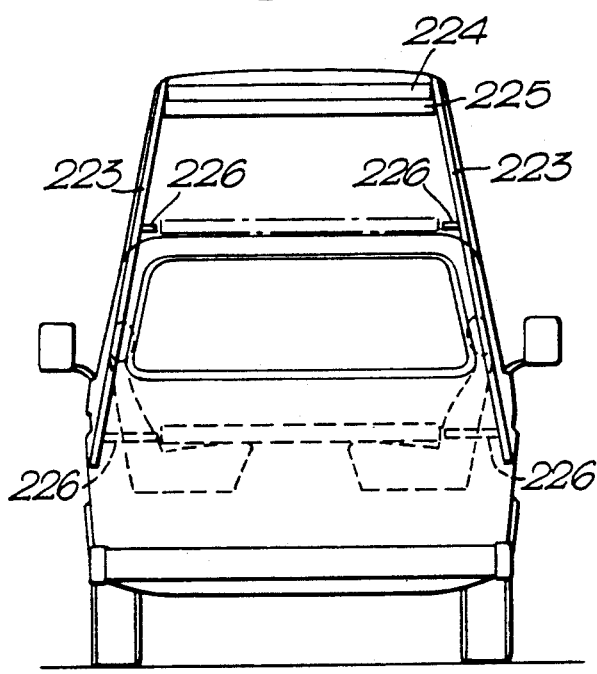
FIG. 53 shows a schematic front view of a camping car wherein the guide rails for the berths have a downwards diverging course.
Figure 54:
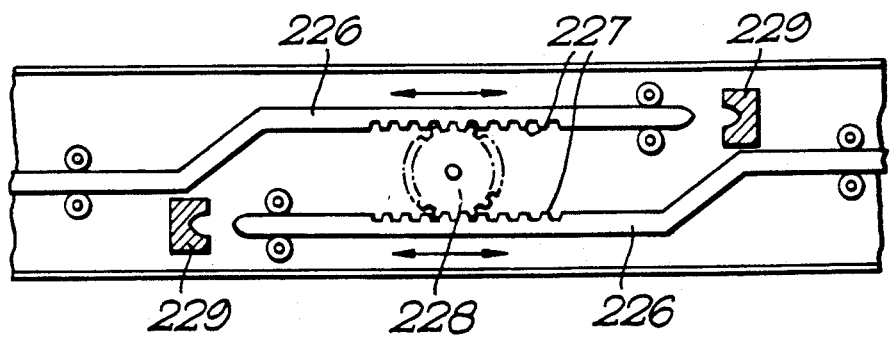
FIG. 54 shows an embodiment of an extendable arm arrangement between berth and sliding bodies, for use in the system in FIG. 53.

The system according to the invention also can be adapted for small rooms or compartments having opposite inclining walls. The guide rails mainly are to follow the incline of the walls. FIG. 53 shows an example camping car having downwardly diverging side walls where guide rails 223 follow the side walls. As appears from the Figure, the sliders (not specifically shown) of the two berths 224, 225 are connected to the berths via arms 226, which are moved or pulled out from the berths as the berths move downwards. It must be ensured that the arms of each berth are pulled out (or pushed in) in a controlled manner, so that the berth is moved to a definite end position. An example of an arrangement ensuring this is shown in FIG. 54. The arms 226 are provided over a suitable length with rack teeth 227 which are in engagement with a gear wheel 228 to ensure equal amount of movement of the arms in opposite directions. For stable retention of the arms 226 in their pulled-in position, there are provided holders 229 for engagement with the inner ends of the arms.

I claim:

1. A system for optimal space utilization in a compartment having a limited space, said system comprising:
    at least one moveable berth installed in said compartment;
    driving means operatively connected to said berth for moving said berth to at least an upper position and a lower position, said berth being positioned essentially horizontally in both said upper and lower positions;
    guide means working cooperatively with said berth for guiding said berth along substantially vertical guide rails adjacent to the walls of the compartment;
    at least one pivotable chair permanently mounted below said berth and capable of being maneuvered into a position to provide necessary space to allow said berth to be moved to said lower position; and
    means operatively connected to said chair for enabling said driving means to move said berth only when said chair is maneuvered to a specific position.

2. A system according to claim 1, wherein said driving means comprises a reversible electric motor coupled through a circuit to a voltage source; and
    wherein said enabling means comprises electrical contacts electrically connected to said motor, said contacts closing to energize said motor only when said chair is in said specific position.

3. A system according to claim 2, especially for a compartment in a railway carriage and the like, wherein the system comprises a pair of berth pairs, the berths being located one above the other in each pair and said pairs being arranged adjacent to each other; and
    wherein each berth pair is coupled to a respective driving means and is arranged above a respective chair group so that said berth pairs can be moved individually to the lower position after the chair group in question has been maneuvered to said specific position.

4. A system according to claim 2, especially for a compartment in a camping car and the like, wherein said berth is a double bed lowerable over a chair group comprising a plurality of swivelling as well as folding chairs;
    wherein, when said berth is raised, said chairs are optionally capable of being positioned in the direction to which said car is travelling or maneuvered inwards towards a folding table which can be put up from a position set into the floor.

5. A system according to claim 2, especially for a driver's cab of a transport vehicle, wherein said cab comprises a superstructure providing ample headroom; and
    wherein the system comprises at least one transversely extending berth mounted in the space above the driver's seat and a side seat, and being guided by respective guide rails extending along the side walls of the driver's cab, the driver's seat and the side seat capable of being maneuvered to make room for lowering the berth to the lower position.

6. A system according to claim 1, wherein said guide means comprises sliding bodies which are slidable in grooves in said guide rails; and
    wherein at least some of said guide rails comprises enlarged portions for receiving linings for absorbing vibrations caused by movement of said sliding bodies.

7. A system according to claim 6, wherein said driving means comprises a reversible motor operatively connected to said berth via transmission means and a number of wires running over supporting pulley means; and
    wherein said wires have respective ends connected to corresponding said sliding bodies carried in longitudinally extending inner passages in said rails.

8. A system according to claim 7, further comprising:
    holding means provided in connection with at least some of said enlarged portions for retaining said berth.

9. A system according to claim 7, wherein two berths are arranged one above the other; and
    wherein said wires are connected to sliding bodies of the lower berth only, the upper berth being arranged to rest on the lower berth when the berths are in a raised position above the lower position of the upper berth, so that the upper berth is raised and lowered by the lower berth.

10. A system according to claim 6, further comprising:
holding means provided in connection with at least some of said enlarged portions for retaining said berth.

11. A system according to claim 1, especially for a compartment in a railway carriage and the like, wherein the system comprises a pair of berth pairs, the berths being located one above the other in each pair and said pairs being arranged adjacent to each other; and
wherein each berth pair is coupled to a respective driving means and is arranged above a respective chair group so that said berth pairs can be moved individually to the lower position after the chair group in question has been maneuvered to said specific position.

12. A system according to claim 11, further comprising:
shield means connected to at least one berth of each berth pair, said shield means being arranged to be moved together with said berth to prevent direct viewing into the compartment when said berth is in the lower position.

13. A system according to claim 1, wherein said compartment is in a vehicle;
wherein said berth is a double bed lowerable over a chair group including a plurality of swivelling and folding chairs;
wherein said chairs are positionable in the direction to which said vehicle is travelling or towards a dining table.

14. A system according to claim 13, wherein said dining table is foldable into a folded or unfolded position;
wherein, when said table is in the folded position, it is locked by an electromagnet electrically connected to normally open contacts provided on the chairs, said contact closing when the chairs are in a given position so that said table can be set to its unfolded position only when the chairs are placed in said given position.

15. A system according to claim 14, wherein said vehicle includes at least one window, further comprising:
screening means movable to cover said window of said vehicle when said berth is in the lower position, said screening means being supported by a wire running in a rail extending along the inner walls of said vehicle, said wire being coupled to a motor for effectively moving said screening means.

16. A system according to claim 13, wherein said vehicle includes at least one window, further comprising:
screening means movable to cover said window of said vehicle when said berth is in the lower position, said screening means being supported by a wire running in a rail extending along the inner walls of said vehicle, said wire being coupled to a motor for effectively moving said screening means.

17. A system according to claim 1, especially for a compartment in a camping car and the like, wherein said berth is a double bed lowerable over a chair group comprising a plurality of swivelling as well as folding chairs;
wherein, when said berth is raised, said chairs are optionally capable of being positioned in the direction to which said car is travelling or maneuvered inwards towards a folding table which can be put up from a position set into the floor.

18. A system according to claim 17, wherein said table in the folded position is blocked by an electromagnet connected to a circuit in which there are also connected normally open contacts provided on said chairs, said contacts being arranged to be closed when said chairs are positioned in a definite position so that the table can be raised only when said chairs are placed in said definite position.

19. A system according to claim 1, especially for a driver's cab of a transport vehicle, wherein said cab comprises a superstructure providing ample headroom; and
wherein the system comprises at least one transversely extending berth mounted in the space above the driver's seat and a side seat, and being guided by respective guide rails extending along the side walls of the driver's cab, the driver's seat and the side seat capable of being maneuvered to make room for lowering the berth to the lower position.

20. A system according to clam 19, wherein said driver's cab in the rearward position comprises:
at least a kitchen; and
the system further comprising a safety arm arranged to provide support to a standing person for preparing food during movement of said vehicle, said safety arm being pivotably attached to a side wall of the driver's cab for pivoting towards the wall when not in use.

* * * * *